United States Patent
Kim et al.

(10) Patent No.: US 12,086,707 B2
(45) Date of Patent: Sep. 10, 2024

(54) NEURAL PROCESSING UNIT BEING OPERATED ACCORDING TO DYNAMICALLY CALIBRATED PHASE OF CLOCK SIGNAL

(71) Applicant: DEEPX CO., LTD., Seongnam-si (KR)

(72) Inventors: Lok Won Kim, Yongin-si (KR); Seong Jin Lee, Seongnam-si (KR); Jung Boo Park, Seoul (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/530,909

(22) Filed: Dec. 6, 2023

(65) Prior Publication Data

US 2024/0112005 A1 Apr. 4, 2024

(30) Foreign Application Priority Data

Oct. 11, 2023 (KR) .......... 10-2023-0134879

(51) Int. Cl.
| | | |
|---|---|---|
| *G06F 1/10* | (2006.01) | |
| *G06F 1/06* | (2006.01) | |
| *G06N 3/02* | (2006.01) | |
| *G06N 3/0464* | (2023.01) | |
| *G06N 3/063* | (2023.01) | |
| *G06N 20/00* | (2019.01) | |

(52) U.S. Cl.
CPC .............. *G06N 3/063* (2013.01); *G06F 1/06* (2013.01); *G06N 3/0464* (2023.01)

(58) Field of Classification Search
CPC ......... G06N 3/063; G06N 3/0464; G06F 1/06
See application file for complete search history.

(56) References Cited

U.S. PATENT DOCUMENTS

| | | | |
|---|---|---|---|
| 2019/0101952 A1* | 4/2019 | Diamond | G06F 15/825 |
| 2020/0364545 A1* | 11/2020 | Shattil | G06N 3/08 |
| 2021/0247797 A1* | 8/2021 | Gu | G06F 1/10 |
| 2022/0019441 A1* | 1/2022 | Rosing | G16B 30/10 |
| 2022/0036123 A1* | 2/2022 | Cummings | G06N 20/00 |
| 2022/0066740 A1* | 3/2022 | Radhadevi | G06G 7/16 |
| 2022/0206068 A1* | 6/2022 | Kim | G01R 31/31713 |
| 2022/0345417 A1* | 10/2022 | Kasichainula | H04L 47/30 |
| 2022/0405566 A1* | 12/2022 | Winterbottom | G02B 6/30 |
| 2023/0334289 A1* | 10/2023 | Zaglewski | G06N 3/044 |
| 2023/0359878 A1* | 11/2023 | Anderson | G06N 3/049 |

* cited by examiner

*Primary Examiner* — Brandon S Cole
(74) *Attorney, Agent, or Firm* — Bridgeway IP Law Group, PLLC; Jihun Kim

(57) ABSTRACT

A neural processing unit may comprise a first circuit configured to perform operations for an artificial neural network (ANN) model, and arranged for a plurality of groups of processing elements (PEs) including a plurality of PEs; a second circuit arranged to output a plurality of clock signals to the first circuit; a third circuit configured to measure a ratio of peak power and average power of at least the first circuit; and a fourth circuit, arranged to dynamically calibrate a phase of at least one of the plurality of clock signals of the second circuit based on the ratio of peak power and average power measured in the third circuit.

17 Claims, 17 Drawing Sheets

| Layer name | Input feature map | | | Kernel | | | Output feature map | | | # Strides | Algorithm | | MAC | Data size (Byte) | | |
|---|---|---|---|---|---|---|---|---|---|---|---|---|---|---|---|---|
| | Height | Width | Ch # | Height | Width | # | Height | Width | Ch # | | AVG_pooling | Activation | | Kernel_SIZE | IFMAP_SIZE | OFMAP_SIZE |
| 1 | 224 | 224 | 3 | 3 | 3 | 32 | 112 | 112 | 32 | 2 | NO | RELU | 10,838,016 | 864 | 150,528 | 401,408 |
| 2 | 112 | 112 | 32 | 3 | 3 | 1 | 112 | 112 | 32 | 1 | NO | RELU | 3,612,672 | 288 | 401,408 | 401,408 |
| 3 | 112 | 112 | 32 | 1 | 1 | 64 | 112 | 112 | 64 | 1 | NO | RELU | 25,690,112 | 2,048 | 401,408 | 802,816 |
| 4 | 112 | 112 | 64 | 3 | 3 | 1 | 56 | 56 | 64 | 2 | NO | RELU | 1,806,336 | 576 | 802,816 | 200,704 |
| 5 | 56 | 56 | 64 | 1 | 1 | 128 | 56 | 56 | 128 | 1 | NO | RELU | 25,690,112 | 8,192 | 200,704 | 401,408 |
| 6 | 56 | 56 | 128 | 3 | 3 | 1 | 56 | 56 | 128 | 1 | NO | RELU | 3,612,672 | 1,152 | 401,408 | 401,408 |
| 7 | 56 | 56 | 128 | 1 | 1 | 128 | 56 | 56 | 128 | 1 | NO | RELU | 51,380,224 | 16,384 | 401,408 | 401,408 |
| 8 | 56 | 56 | 128 | 3 | 3 | 1 | 28 | 28 | 128 | 2 | NO | RELU | 903,168 | 1,152 | 401,408 | 100,352 |
| 9 | 28 | 28 | 128 | 1 | 1 | 256 | 28 | 28 | 256 | 1 | NO | RELU | 25,690,112 | 32,768 | 100,352 | 200,704 |
| 10 | 28 | 28 | 256 | 3 | 3 | 1 | 28 | 28 | 256 | 1 | NO | RELU | 1,806,336 | 2,304 | 200,704 | 200,704 |
| 11 | 28 | 28 | 256 | 1 | 1 | 256 | 28 | 28 | 256 | 1 | NO | RELU | 51,380,224 | 65,536 | 200,704 | 200,704 |
| 12 | 28 | 28 | 256 | 3 | 3 | 1 | 14 | 14 | 256 | 2 | NO | RELU | 451,584 | 2,304 | 200,704 | 50,176 |
| 13 | 14 | 14 | 256 | 1 | 1 | 512 | 14 | 14 | 512 | 1 | NO | RELU | 25,690,112 | 131,072 | 50,176 | 100,352 |
| 14 | 14 | 14 | 512 | 3 | 3 | 1 | 14 | 14 | 512 | 1 | NO | RELU | 903,168 | 4,608 | 100,352 | 100,352 |
| 15 | 14 | 14 | 512 | 1 | 1 | 512 | 14 | 14 | 512 | 1 | NO | RELU | 51,380,224 | 262,144 | 100,352 | 100,352 |
| 16 | 14 | 14 | 512 | 3 | 3 | 1 | 14 | 14 | 512 | 1 | NO | RELU | 903,168 | 4,608 | 100,352 | 100,352 |
| 17 | 14 | 14 | 512 | 1 | 1 | 512 | 14 | 14 | 512 | 1 | NO | RELU | 51,380,224 | 262,144 | 100,352 | 100,352 |
| 18 | 14 | 14 | 512 | 3 | 3 | 1 | 14 | 14 | 512 | 1 | NO | RELU | 903,168 | 4,608 | 100,352 | 100,352 |
| 19 | 14 | 14 | 512 | 1 | 1 | 512 | 14 | 14 | 512 | 1 | NO | RELU | 51,380,224 | 262,144 | 100,352 | 100,352 |
| 20 | 14 | 14 | 512 | 3 | 3 | 1 | 14 | 14 | 512 | 1 | NO | RELU | 903,168 | 4,608 | 100,352 | 100,352 |
| 21 | 14 | 14 | 512 | 1 | 1 | 512 | 14 | 14 | 512 | 1 | NO | RELU | 51,380,224 | 262,144 | 100,352 | 100,352 |
| 22 | 14 | 14 | 512 | 3 | 3 | 1 | 14 | 14 | 512 | 1 | NO | RELU | 903,168 | 4,608 | 100,352 | 100,352 |
| 23 | 14 | 14 | 512 | 1 | 1 | 512 | 14 | 14 | 512 | 1 | NO | RELU | 51,380,224 | 262,144 | 100,352 | 100,352 |
| 24 | 14 | 14 | 512 | 3 | 3 | 1 | 7 | 7 | 512 | 2 | NO | RELU | 225,792 | 4,608 | 100,352 | 25,088 |
| 25 | 7 | 7 | 512 | 1 | 1 | 1,024 | 7 | 7 | 1,024 | 1 | NO | RELU | 25,690,112 | 524,288 | 25,088 | 50,176 |
| 26 | 7 | 7 | 1,024 | 3 | 3 | 1 | 7 | 7 | 1,024 | 1 | NO | RELU | 451,584 | 9,216 | 50,176 | 50,176 |
| 27 | 7 | 7 | 1,024 | 1 | 1 | 1,024 | 7 | 7 | 1,024 | 1 | YES | RELU | 51,380,224 | 1,048,576 | 50,176 | 1,024 |
| 28 | 1 | 1 | 1,024 | 1 | 1 | 1,000 | 1 | 1 | 1,000 | 1 | NO | NO | 1,024,000 | 1,024,000 | 1,024 | 1,000 |

FIG. 6B

NEURAL PROCESSING UNIT BEING OPERATED ACCORDING TO DYNAMICALLY CALIBRATED PHASE OF CLOCK SIGNAL

CROSS-REFERENCE TO RELATED APPLICATIONS

This application claims the priority of Korean Patent Application No. 10-2023-0134879 filed on Oct. 11, 2023, in the Korean Intellectual Property Office, the disclosure of which is incorporated herein by reference.

BACKGROUND OF THE DISCLOSURE

Technical Field

The present disclosure relates to a technique for lowering instantaneous power consumption of a neural processing unit.

Background Art

Artificial intelligence (AI) is rapidly advancing. AI refers to artificially imitating human intelligence, that is, intelligence capable of recognition, classification, inference, prediction, control/decision making, and the like.

In recent times, to enhance the computational speed for artificial intelligence (AI), a neural processing unit (NPU) has been developed.

Depending on the specific AI service requirements, different types of artificial neural network (ANN) models may exist. For instance, when processing an image or video, a CNN type artificial neural network model can be employed for tasks like object classification, object detection, object tracking, and the like.

Generally, each layer of an artificial neural network model involves varying levels of computation.

In particular, when a specific layer requires a significant increase in computational operations, it can lead to an instantaneous surge in power consumption of a neural processing unit.

SUMMARY OF THE DISCLOSURE

Artificial neural network operation has a data-intensive characteristic. In particular, artificial neural network calculations require parallel processing calculations. In other words, the artificial neural network operation has a characteristic in that the processing speed is lowered if a large amount of data cannot be processed in parallel at a high speed at the same time.

Accordingly, the inventors of the present disclosure developed a neural processing unit specialized for artificial neural network calculation. The inventors of the present disclosure have attempted to improve the parallel processing performance of the neural processing unit by increasing the number of a plurality of processing elements of the neural processing unit. In addition, the inventors of the present disclosure have attempted to develop a neural processing unit capable of low-power operation.

Meanwhile, a power supply unit of a neural processing unit specialized for low-power operation installed in an edge device may have relatively low power supply capability compared to a power supply unit of a graphic processing unit (GPU) operating in a server or personal computer (PC). In addition, capacitance of a power supply unit of a neural processing unit specialized for low-power operation installed in an edge device may be insufficient to handle peak power supply.

However, the inventors of the present disclosure have recognized that as the number of processing elements of the neural processing unit specialized for low-power operation increases, the degree of instantaneously fluctuating supply voltage may increase. In other words, the required amount of instantaneous power supply of the neural processing unit may be proportional to the number of operating processing elements.

In addition, the amount of computation of the artificial neural network model varies considerably for each layer. Therefore, the number of processing elements operating in parallel may be different according to the amount of computation of the layer of the artificial neural network model. That is, when many processing elements operate at the same time, the voltage of the power supply unit of the neural processing unit may fluctuate or drop instantaneously.

Furthermore, the computation of certain layers of the neural network model may be very small. In such cases, it has been recognized by the inventors of the present disclosure that the stability of the supply voltage of the neural processing unit can be ensured even if the drive frequency of the neural processing unit is increased.

In addition, when the supply voltage fluctuates or drops instantaneously, there may be a case in which the supply voltage VDD needs to be raised for system stability. Therefore, if system safety is not secured, a problem in which the supply voltage is unnecessarily increased may occur. When the supply voltage increases, power consumption of the neural processing unit may rapidly increase. In such cases, the inventors of the present disclosure have recognized that the voltage of the supply power unit of the neural processing unit can be stabilized by reducing the drive frequency of the neural processing unit.

Conversely, as the supply voltage becomes more stable, a level of the supply voltage VDD can be reduced. Therefore, if the stability of the supply voltage of the neural processing unit is ensured, the supply voltage can be reduced, and consequently, the power consumption of the neural processing unit can be reduced.

Accordingly, the inventors of the present disclosure recognized that it is necessary to improve the stability of a supply voltage of a neural processing unit specialized in artificial neural network operation even when peak power is increased as the number of processing elements increases.

Accordingly, the disclosures in the present disclosure are aimed at disclosing technical solutions for stabilizing the fluctuation of the supply voltage of the supply power unit due to excessive power at a certain operation step.

According to an example of the present disclosure, a neural processing unit (NPU) may be provided. The NPU may comprise a first circuit configured to perform operations for an artificial neural network (ANN) model, and arranged for a plurality of groups of processing elements (PEs) including a plurality of PEs; a second circuit arranged to output a plurality of clock signals to the first circuit; a third circuit configured to measure a ratio of peak power and average power of at least the first circuit; and a fourth circuit arranged to dynamically calibrate a phase of at least one of the plurality of clock signals of the second circuit based on the ratio of peak power and average power measured in the third circuit.

If a peak power value measured by the third circuit is higher than a threshold power value, the fourth circuit may dynamically adjust the phase of at least one of the plurality of clock signals.

At least one phase of the plurality of clock signals may be adjusted based on a predetermined threshold power value based on utilization rate of the plurality of groups of PEs.

The third circuit may be configured to measure a first peak power value of the first circuit. The third circuit may be configured to provide the first peak power value to the fourth circuit. The fourth circuit may be configured to correct the phase of at least one of the plurality of clock signals. The third circuit may be configured to re-measure a second peak power value of the first circuit. The fourth circuit may be configured to determine whether the second peak power value is less than the first peak power value.

The third circuit may be configured to measure a first peak power value at a first time point. The fourth circuit may be configured to correct the phase of at least one of the plurality of clock signals by comparing the first peak power value at the first time point with a predetermined threshold power value.

The plurality of clock signals may include: a first clock signal operated by a first group of PEs of the plurality of groups of PEs; and a second clock signal operated by a second group of PEs of the plurality of groups of PEs.

The plurality of clock signals may include: a first clock signal having a first phase; and a second clock signal having a second phase that is later than the first phase of the first clock signal.

The plurality of clock signals may include: a first clock signal generated based on a source clock signal; and a second clock signal generated by shifting or drifting the source clock signal.

The first circuit may include: a source clock signal; one or more phase converters connected in a chain, wherein the one or more phase converters include a first phase converter connected to the source clock signal; and a selector connected to an output of the source clock signal and an output of the one or more phase converters, wherein the selector is configured to select at least one output from the output of the source clock signal and the output of the one or more phase converters.

According to an example of the present disclosure, a system on chip (SoC) may be provided. The SoC may comprise: a semi-conductor substrate; a first circuit, disposed on the semi-conductor substrate, configured to perform operations for an artificial neural network (ANN) model, and arranged for a plurality of groups of processing elements (PEs) including a plurality of PEs; a second circuit, disposed on the semi-conductor substrate, arranged to output a plurality of clock signals to the first circuit; a third circuit, disposed on the semi-conductor substrate, configured to measure a ratio of peak power and average power of at least the first circuit; and a fourth circuit, disposed on the semi-conductor substrate, arranged to dynamically calibrate a phase of at least one of the plurality of clock signals of the second circuit based on the ratio of peak power and average power measured in the third circuit.

If a peak power value measured by the third circuit is higher than a threshold power value, the fourth circuit may dynamically adjust the phase of at least one of the plurality of clock signals.

At least one phase of the plurality of clock signals may be adjusted based on a predetermined threshold power value based on utilization rate of the plurality of groups of PEs.

The third circuit may be configured to measure a first peak power value of the first circuit. The third circuit may be configured to provide the first peak power value to the fourth circuit. The fourth circuit may be configured to correct the phase of at least one of the plurality of clock signals. The third circuit may be configured to re-measure a second peak power value of the first circuit. The fourth circuit may be configured to determine whether the second peak power value is less than the first peak power value.

The third circuit may be configured to measure a first peak power value at a first time point, wherein the fourth circuit may be configured to correct the phase of at least one of the plurality of clock signals by comparing the first peak power value at the first time point with a predetermined threshold power value.

The plurality of clock signals may include: a first clock signal operated by a first group of PEs of the plurality of groups of PEs; and a second clock signal operated by a second group of PEs of the plurality of groups of PEs.

According to an example of the present disclosure, an electronic device may be provided. The electronic device may comprise: a printed circuit board; a first circuit, disposed on the printed circuit board, configured to perform operations for an artificial neural network (ANN) model, and arranged for a plurality of groups of processing elements (PEs) including a plurality of PEs; a second circuit, disposed on the printed circuit board, arranged to output a plurality of clock signals to the first circuit; a third circuit, disposed on the printed circuit board, configured to measure a ratio of peak power and average power of at least the first circuit; and a fourth circuit, disposed on the printed circuit board, arranged to dynamically calibrate a phase of at least one of the plurality of clock signals of the second circuit based on the ratio of peak power and average power measured in the third circuit.

If a peak power value measured by the third circuit is higher than a threshold power value, the fourth circuit may dynamically adjust the phase of at least one of the plurality of clock signals.

At least one phase of the plurality of clock signals may be adjusted based on a predetermined threshold power value based on utilization rate of the plurality of groups of PEs.

The third circuit may be configured to measure a first peak power value of the first circuit. The third circuit may be configured to provide the first peak power value to the fourth circuit. The fourth circuit may be configured to correct the phase of at least one of the plurality of clock signals. The third circuit may be configured to re-measure a second peak power value of the first circuit. The fourth circuit may be configured to determine whether the second peak power value is less than the first peak power value.

The third circuit may be configured to measure a first peak power value at a first time point, wherein the fourth circuit may be configured to correct the phase of at least one of the plurality of clock signals by comparing the first peak power value at the first time point with a predetermined threshold power value.

According to examples of the present disclosure, an artificial neural network operation is performed in a distributed manner according to a plurality of clock signals, thereby reducing power at a certain operation step.

According to examples of the present disclosure, an artificial neural network operation is performed in a distributed manner according to a plurality of clock signals, thereby improving the stability of a supply voltage supplied to a neural processing unit.

According to the examples of the present disclosure, the artificial neural network operations are distributed according to a plurality of clock signals, so that the power consumption of the neural processing unit can be significantly reduced by reducing the supply voltage supplied to the neural processing unit.

BRIEF DESCRIPTION OF THE DRAWINGS

FIG. 6B is an exemplary table showing the size of data for each layer in the exemplary artificial neural network model shown in FIG. 6A.

DETAILED DESCRIPTION OF THE EMBODIMENT

Figure 1:
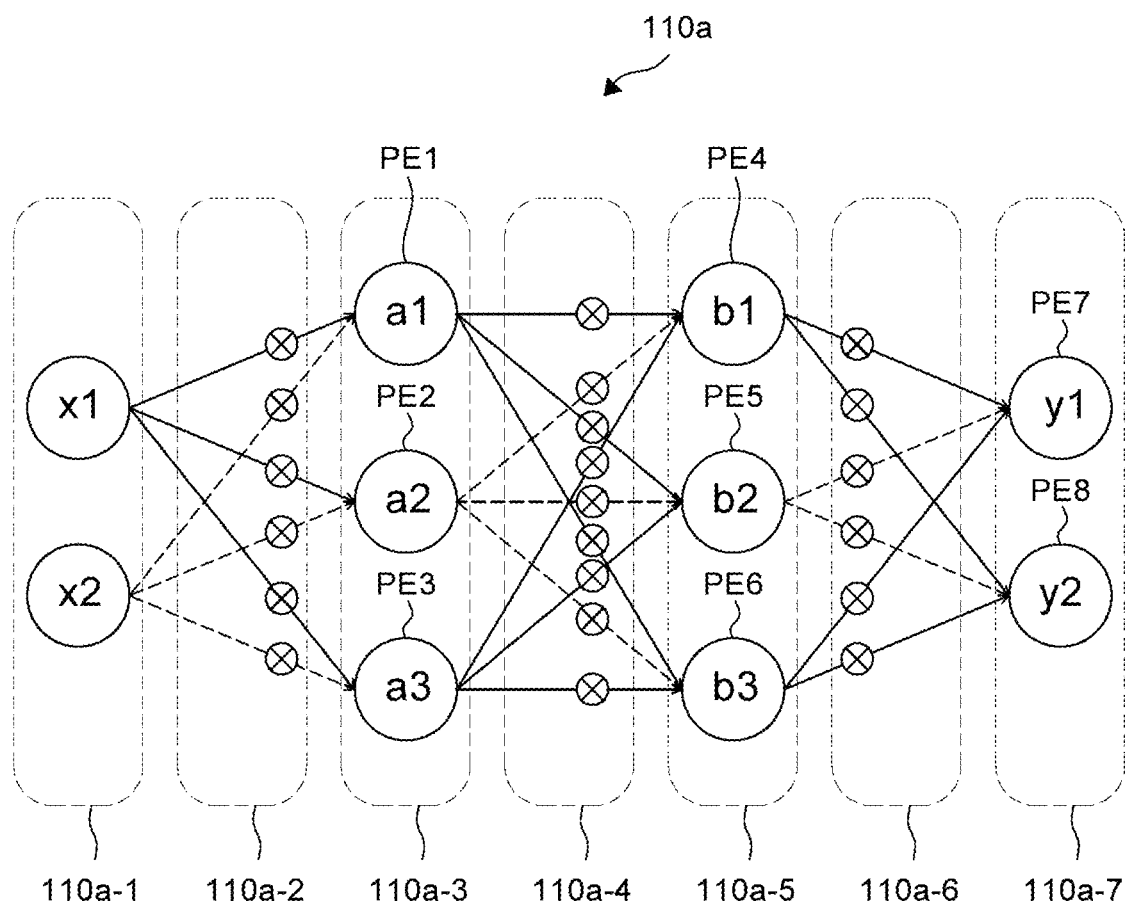
FIG. 1 is a schematic conceptual diagram illustrating an exemplary artificial neural network model.

Specific structural or step-by-step descriptions for the embodiments according to the concept of the present disclosure disclosed in the present disclosure or application are merely illustrative for the purpose of describing the embodiments according to the concept of the present disclosure. The examples according to the concept of the present disclosure may be carried out in various forms and are not interpreted as that the present disclosure is limited to the examples described in the present disclosure or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are in line with the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present disclosure are used only to describe specific examples, and are not intended to limit the present disclosure. A singular form may include a plural form if there is no clearly opposite meaning in the context. In the present disclosure, it should be understood that terms "include" or "have" indicate that a feature, a number, a step, an operation, a component, a part, or a combination thereof described in the present disclosure is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in the present disclosure.

In describing examples, descriptions of technical contents that are well known in the art to which the present disclosure pertains and are not directly related to the present disclosure will be omitted. The omission is to convey the gist of the present disclosure more clearly without the obscuration of the unnecessary description of well-known technical details.

Definitions of Terms

Here, in order to help the understanding of the examples proposed in the present disclosure, terminologies used in the present disclosure will be defined in brief.

NPU is an abbreviation for a neural processing unit and refers to a processor specialized for an operation of an artificial neural network model separately from the central processor (CPU).

ANN is an abbreviation for an artificial neural network and refers to a network which connects nodes in a layered structure by imitating the connection of the neurons in the human brain through a synapse to imitate the human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by explaining examples of the present disclosure with reference to the accompanying drawings.

Artificial Intelligence

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called an artificial neural network model. In other words, an artificial neural network is a system in which nodes that imitate neurons are connected in a layer structure.

These artificial neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, an artificial neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels. Parameters can be processed in the NPU by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs.

FIG. 1 illustrates an exemplary artificial neural network model.

Hereinafter, an operation of an exemplary artificial neural network model 110a which may operate in the neural processing unit 100 will be explained.

The exemplary artificial neural network model 110a of FIG. 1 may be an artificial neural network trained to perform various inference functions such as object detection or voice recognition.

The artificial neural network model 110a may be a deep neural network (DNN).

However, the artificial neural network model 110a according to the examples of the present disclosure is not limited to the deep neural network.

For example, the artificial neural network model can be a model such as ViT, DaViT, MobileViT, Swin-Transformer, Transformer, YOLO (You Only Look Once), CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the artificial neural network model 110a may be an ensemble model based on at least two different models.

Hereinafter, an inference process by the exemplary artificial neural network model 110a will be described.

The artificial neural network model 110a may be an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited only to the artificial neural network model illustrated in FIG. 1. The first hidden layer 110a-3 and the second hidden layer 110a-5 may also be referred to as a plurality of hidden layers.

The input layer 110a-1 may exemplarily include input nodes x1 and x2. That is, the input layer 110a-1 may include information about two input values.

For example, the first connection network 110a-2 may include information about six weight values for connecting nodes of the input layer 110a-1 to nodes of the first hidden layer 110a-3, respectively. Each weight value is multiplied with the input node value, and an accumulated value of the multiplied values is stored in the first hidden layer 110a-3. Here, the nodes and weights may be referred to as parameters.

For example, the first hidden layer 110a-3 may include nodes a1, a2, and a3. That is, the first hidden layer 110a-3 may include information about three node values.

The first processing element PE1 of FIG. 1 may perform the MAC operation of the a1 node.

The second processing element PE2 of FIG. 1 may perform the MAC operation of the a2 node.

The third processing element PE3 of FIG. 1 may perform the MAC operation of the a3 node.

For example, the second connection network 110a-4 may include information about nine weight values for connecting nodes of the first hidden layer 110a-3 to nodes of the second hidden layer 110a-5, respectively. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three node values.

The fourth processing element PE4 of FIG. 1 may process the operation of the b1 node.

The fifth processing element PE5 of FIG. 1 may process the operation of node b2.

The sixth processing element PE6 of FIG. 1 may process the operation of node b3.

For example, the third connection network 110a-6 may include information about six weight values which connect nodes of the second hidden layer 110a-5 and nodes of the output layer 110a-7, respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two node values.

The seventh processing element PE7 of FIG. 1 may process the operation of node y1.

The eighth processing element PE8 of FIG. 1 may process the operation of node y2.

Each node may correspond to a feature value, and the feature value may correspond to a feature map.

Figure 2A:
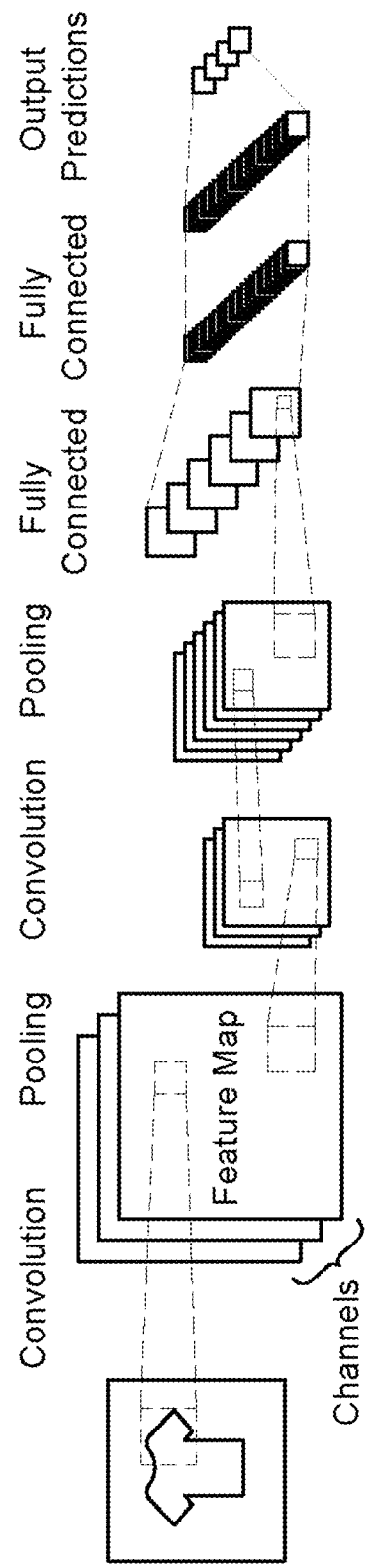
FIG. 2A is a diagram for explaining the basic structure of a convolutional neural network (CNN).

FIG. 2A is a diagram for explaining the basic structure of a convolutional neural network (CNN).

Referring to FIG. 2A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 2B:
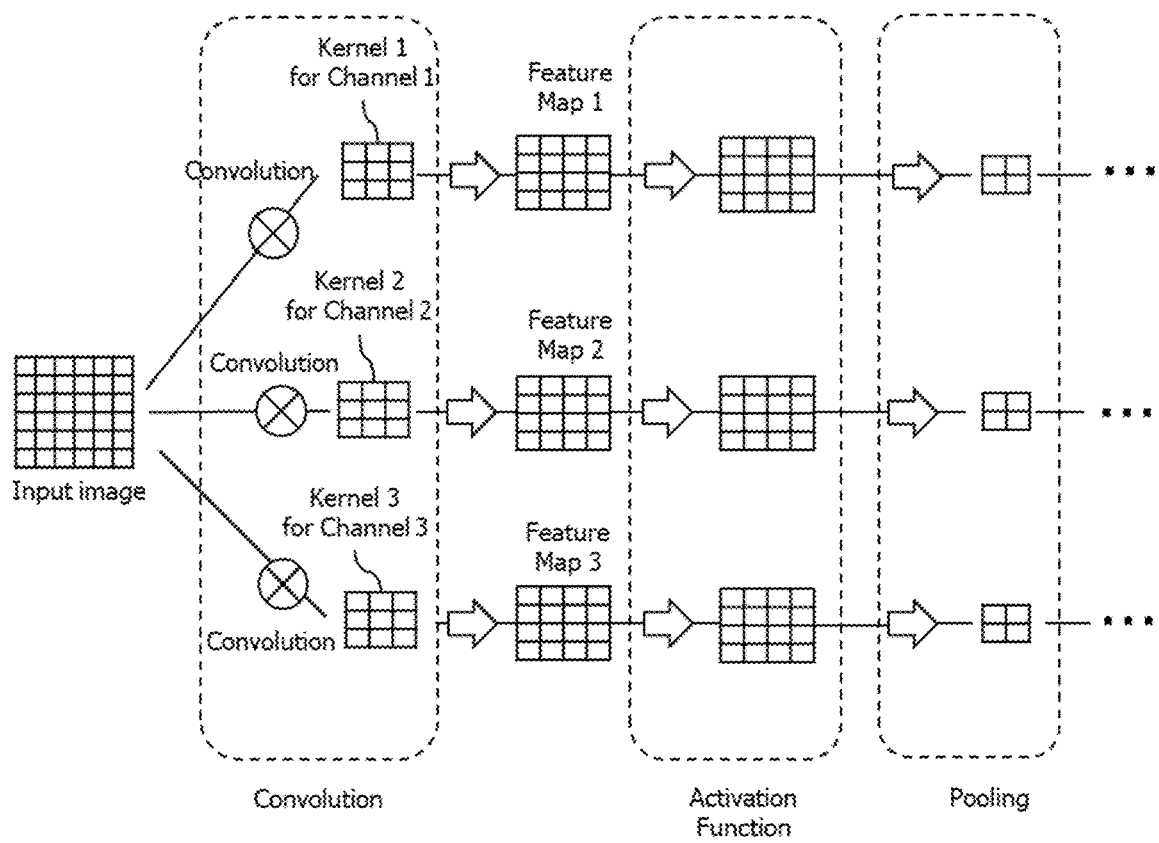
FIG. 2B is a comprehensive diagram showing the operation of a convolutional neural network.

FIG. 2B is a comprehensive diagram showing the operation of a convolutional neural network.

Referring to FIG. 2B, an input image is exemplarily represented as a two-dimensional matrix having a size of 6×6. In addition, FIG. 2B exemplarily illustrates three nodes, channel 1, channel 2, and channel 3.

First, the convolution operation will be described.

The input image (shown as an example of size 6×6 in FIG. 2B) is convolved with a kernel 1 (shown as an example of size 3×3 in FIG. 2B) for channel 1 at the first node, resulting in the output feature map 1 (shown as an example of size 4×4 in FIG. 2B). Similarly, the input image (shown as an example of size 6×6 in FIG. 2B) is convolved with a kernel 2 (shown as an example of size 3×3 in FIG. 2B) for channel 2 at the second node, resulting in the output feature map 2 (shown as an example of size 4×4 in FIG. 2B). Additionally, the input image is convolved with a kernel 3 (shown as an example of size 3×3 in FIG. 2B) for channel 3 at the third node, resulting in the output feature map 3 (shown as an example of size 4×4 in FIG. 2B).

To process each convolution, the processing elements PE1 to PE12 of the neural processing unit 100 are configured to perform a MAC operation.

Next, the operation of the activation function will be described.

The feature map 1, the feature map 2, and the feature map 3 (which are represented as 4×4 examples in FIG. 2B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 2B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 2B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The aforementioned convolution, activation function, and pooling are repeated, and finally, it can be output as fully connected. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

Required Hardware Resources for ANN

Figure 3:
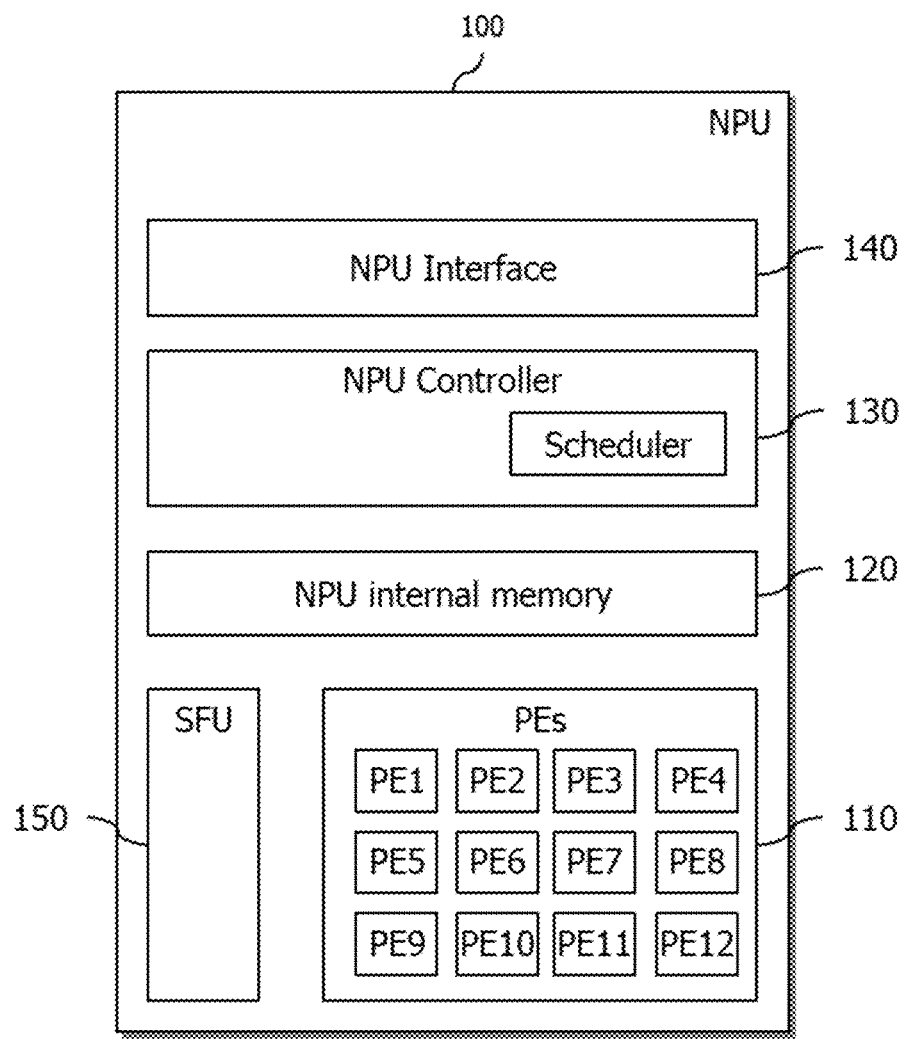
FIG. 3 is a schematic conceptual diagram illustrating a neural processing unit according to an example of the present disclosure.

FIG. 3 is a schematic conceptual diagram illustrating a neural processing unit according to the present disclosure.

Referring to FIG. 3, a neural processing unit (NPU) 100 is a processor specialized to perform an operation for an artificial neural network.

The artificial neural network refers to a network that consists of artificial neurons which, when receiving various inputs or entry stimulations, multiply a weight by the inputs or stimulations, add the multiplied values, and convert a value obtained by additionally adding a deviation using an active function to transmit. The artificial neural network trained as described above may be used to output an inference result from input data.

The neural processing unit 100 may be a semiconductor device implemented by an electric/electronic circuit. The electric/electronic circuit may refer to a circuit including a large number of electronic elements (transistors, capacitors, and the like).

In the case of a transformer and/or CNN-based artificial neural network model, the neural processing unit 100 may select and process matrix multiplication operations, convolution operations, and the like according to the architecture of the artificial neural network.

For example, in each layer of a convolutional neural network (CNN), an input feature map corresponding to input data and a kernel corresponding to weights may be a tensor or matrix composed of a plurality of channels. A convolution operation between the input feature map and the kernel is performed, and a convolution operation and a pooled output feature map are generated in each channel. An activation map of a corresponding channel is generated by applying an activation function to the output feature map. After that, pooling for the activation map may be applied. Here, the activation map may be collectively referred to as an output feature map. For convenience of explanation, the activation map may be referred to as an output feature map.

However, examples of the present disclosure are not limited thereto, and the output feature map means that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for processing additional algorithms. That is, some circuit units of the SFU 150 to be described later may be configured to be included in the plurality of processing elements 110.

The neural processing unit 100 may be configured to include a plurality of processing elements 110 for processing convolution and matrix multiplication necessary for the above-described artificial neural network operation.

The neural processing unit 100 may be configured to include each processing circuit optimized for matrix-multiplication operation, convolution operation, activation function operation, pooling operation, stride operation, batch-normalization operation, skip-connection operation, concatenation operation, quantization operation, clipping operation, padding operation, and the like required for the above-described artificial neural network operation.

For example, the neural processing unit 100 may be configured to include the SFU 150 for processing at least one of activation function operation, pooling operation, stride operation, batch-normalization operation, skip-connection operation, concatenation operation, quantization operation, clipping operation, and padding operation for the above-described algorithms.

The neural processing unit 100 may include a plurality of processing elements (PE) 110, an NPU internal memory 120, an NPU controller 130, and an NPU interface 140. Each of the plurality of processing elements 110, the NPU internal memory 120, the NPU controller 130, and the NPU interface 140 may be a semiconductor circuit to which a large number of the electronic elements are connected. Therefore, some of electronic elements may be difficult to identify or be distinguished with the naked eye, but may be identified only by a circuitry operation.

For example, an arbitrary circuit may operate as a plurality of the processing elements 110, or may operate as an NPU controller 130. The NPU controller 130 may be configured to perform the function of the control unit that is configured to control the artificial neural network inference operation of the neural processing unit 100.

The neural processing unit 100 may include a NPU controller 130 including an NPU internal memory 120 configured to store parameters of an artificial neural network model that can be inferred from the plurality of processing elements 110 and the SFU 150 and a scheduler configured to control operation schedules of the plurality of processing elements 110, the SFU 150, and the NPU internal memory 120.

The neural processing unit 100 may be configured to process the feature map corresponding to the encoding and decoding method using scalable video coding (SVC) or scalable feature-map coding (SFC). The above schemes are technologies that variably vary the data transmission rate according to the effective bandwidth and signal to noise ratio (SNR) of a communication channel or communication bus. That is, the neural processing unit 100 may be configured to further include an encoder and a decoder.

The plurality of processing elements 110 may perform a portion of the operations for an artificial neural network.

SFU 150 may perform another portion of the operation for the artificial neural network.

The neural processing unit 100 may be configured to hardware-accelerate the computation of the artificial neural network model using the plurality of processing elements 110 and the SFU 150.

The NPU interface 140 may communicate with various components connected to the neural processing unit 100, for example, memories, via a system bus.

The NPU controller 130 may include a scheduler configured to control the operation of multiple processing elements 110 for inference operations of a neural processing unit 100, as well as operations of the SFU 150 and reading and writing order of the internal memory 120 of the NPU.

The scheduler in the NPU controller 130 may be configured to control the plurality of processing elements 110, the SFU 150, and the NPU internal memory 120 based on data locality information or structure information of the artificial neural network model.

The schedular in the NPU controller 130 may analyze or receive analyzed information on a structure of an artificial neural network model which may operate in the plurality of processing elements 110. The analyzed information may be information generated by a compiler. For example, data of the artificial neural network, which may be included in the artificial neural network model may include node data (i.e., feature map) of each layer, data on a layout of layers, locality information of layers or information about the structure, and at least a portion of weight data (i.e., weight kernel) of each of connection networks connecting the nodes of the layers. The data of the artificial neural network may be stored in a memory provided in the NPU controller 130 or the NPU internal memory 120. However, it is not limited thereto, and the data of the artificial neural network may be stored in a separate cache memory or register file provided in the NPU or SoC including the NPU.

The scheduler in the NPU controller 130 may receive scheduling information of an operation sequence of the artificial neural network model to be performed by the neural processing unit 100 based on data locality information or structure information of the compiled artificial neural network model. For example, the scheduling information may be information generated by a compiler. Scheduling information generated by the compiler may be referred to as machine code or binary code.

That is, the scheduling information utilized by the NPU controller 130 may be information generated by a compiler based on data locality information or structure of an artificial neural network model.

In other words, the compiler can efficiently schedule NPUs depending on how well the compiler understands and reconstructs the locality of artificial neural network data, which is a unique characteristic of artificial neural network models.

In other words, the compiler can efficiently schedule the NPU according to how well the compiler understands the hardware structure and performance of the neural processing unit 100.

In other words, when the artificial neural network model is compiled to be executed in the neural processing unit 100 by the compiler, the artificial neural network data locality may be reconstructed. The artificial neural network data locality can be reconstructed according to the algorithms applied to the artificial neural network model and the operating characteristics of the processor.

To elaborate, the artificial neural network data locality can be reconstructed according to a method in which the neural processing unit 100 processes the corresponding artificial neural network model, for example, feature map tiling or a stationary method of processing elements.

To elaborate, artificial neural network data locality can be reconstructed according to the number of processing elements of the neural processing unit 100 and the capacity of the internal memory.

To elaborate, the artificial neural network data locality can be reconstructed according to the bandwidth of the memory communicating with the neural processing unit 100.

This is because the neural processing unit 100 may differently determine the order of necessary data at each moment in each clock cycle even though the same artificial neural network model is operated and processed by each of the factors described above.

Based on the order of data required for the operation of the artificial neural network model, the compiler may determine data locality and generate compiled machine code based on the order of operation of the layers, convolutions and/or matrix multiplications of the artificial neural network.

The scheduler may be configured to utilize scheduling information contained in machine code. The scheduler in the NPU controller 130 may obtain a memory address value in which the feature map and weight data of the layer of the artificial neural network model are stored based on the scheduling information.

For example, the scheduler in the NPU controller 130 may acquire the memory address value of the feature map of the layer of the artificial neural network model and the weight data which are stored in the memory. Accordingly, the scheduler in the NPU controller 130 may acquire feature map of a layer and weight data of an artificial neural network model to be driven from the main memory, to store the acquired data in the NPU internal memory 120.

Feature map of each layer may have a corresponding memory address value.

Each of the weight data may have a corresponding memory address value.

The scheduler in the NPU controller 130 may be provided with scheduling information about the order of operations of the plurality of processing elements 110 based on information about data locality or structure of the neural network model, such as layout information, locality information, or structure of layers of the artificial neural network of the artificial neural network model. The scheduling information may be generated in a compilation step.

The scheduler in the NPU controller 130 may operate differently from conventional CPU scheduling concepts because it operates based on scheduled information based on information about data locality or structure in the artificial neural network model. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing.

In contrast, the scheduler in the NPU controller 130 may control the neural processing unit 100 according to a determined processing order of the neural processing unit 100 based on the data locality information or the information about the structure of the artificial neural network model.

Moreover, the scheduler in the NPU controller 130 may operate the neural processing unit 100 according to the determined the processing order based on the data locality information or the information about the structure of the artificial neural network model and/or data locality information or information about a structure of the neural processing unit 100 to be used.

However, the present disclosure is not limited to the data locality information or the information about the structure of the neural processing unit 100.

The scheduler in the NPU controller 130 may be configured to store the data locality information or the information about the structure of the artificial neural network.

That is, even though only the data locality information or the information about the structure of the artificial neural network of the artificial neural network model is utilized, the scheduler in the NPU controller 130 may determine a processing sequence.

Moreover, the scheduler in NPU controller 130 may determine the processing order of the neural processing unit 100 by considering the data locality information or the information about the structure of the artificial neural network model and data locality information or information about a structure of the neural processing unit 100. Furthermore, it is possible to optimize the processing according to the determined processing order.

That is, the NPU controller 130 may be configured to operate based on machine code compiled by a compiler, but in another example, the NPU controller 130 may be configured to embed an embedded compiler. According to the above-described configuration, the neural processing unit 100 may be configured to receive a file in the form of a framework of various AI software and generate machine code. For example, AI software frameworks may include TensorFlow, PyTorch, Keras, XGBoost, mxnet, DARKNET, ONNX, and the like.

The plurality of processing elements 110 refers to a configuration in which a plurality of processing elements PE1 to PE12 that is configured to operate feature map and weight data of the artificial neural network is deployed. Each processing element may include a multiply and accumulate (MAC) operator and/or an arithmetic logic unit (ALU) operator, but the examples according to the present disclosure are not limited thereto.

Each processing element may further include an additional special function unit for processing the additional special functions.

For example, it is also possible for the processing element PE to be modified and implemented to further include a batch-normalization unit, an activation function unit, an interpolation unit, and the like.

The SFU 150 may include each processing circuit configured to select and process activation function operation, pooling operation, stride operation, batch-normalization operation, skip-connection operation, concatenation operation, quantization operation, clipping operation, padding operation, and the like according to the architecture of the artificial neural network. That is, the SFU 150 may include a plurality of special function arithmetic processing circuit units.

Even though FIG. 3 illustrates a plurality of processing elements as an example, operators implemented by a plurality of multiplier and adder trees may also be configured to be deployed in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 of FIG. 3 is merely an example for the convenience of description and the number of the plurality of processing elements PE1 to PE12 is not limited to 12 or any other integer numbers. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A number of the plurality of processing elements 110 may be designed in consideration of the characteristic of the artificial neural network model in which the neural processing unit 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 4A:
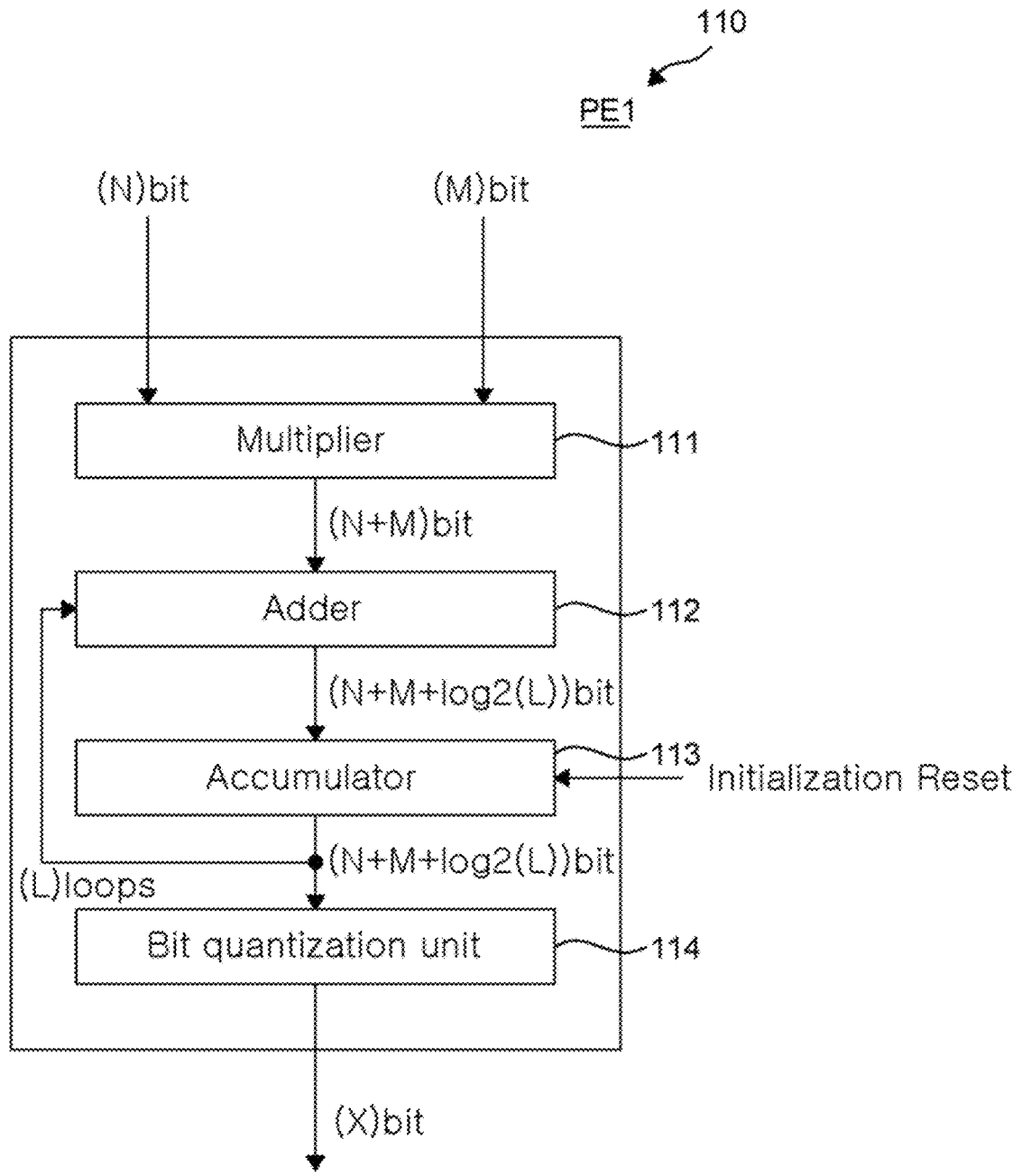
FIG. 4A is a schematic conceptual diagram illustrating one processing element among a plurality of processing elements that may be applied to an example of the present disclosure.

FIG. 4A illustrates one processing element among a plurality of processing elements that may be applied to an example of the present disclosure.

As illustrated in FIG. 3, the neural processing unit 100 according to the examples of the present disclosure may include the plurality of processing elements 110, the NPU internal memory 120 configured to store an artificial neural network model inferred from the plurality of processing elements 110, and the NPU controller 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

As illustrated in FIG. 4A, the first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristic of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log 2(L)) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The bit quantizer 114 may reduce the bit width of the data output from the accumulator 113. The bit quantizer 114 may be controlled by the NPU controller 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Additionally, when the heat generation is reduced, the possibility of the erroneous operation of the neural processing unit 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU controller 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the neural processing unit 100 according to an example of the present disclosure may include a multiplier 111, an adder 112, and an accumulator 113. The bit quantizer 114 may be selected according to whether quantization is applied or not. In another example, the bit quantization unit may also be configured to be included in the SFU 150.

Figure 4B:
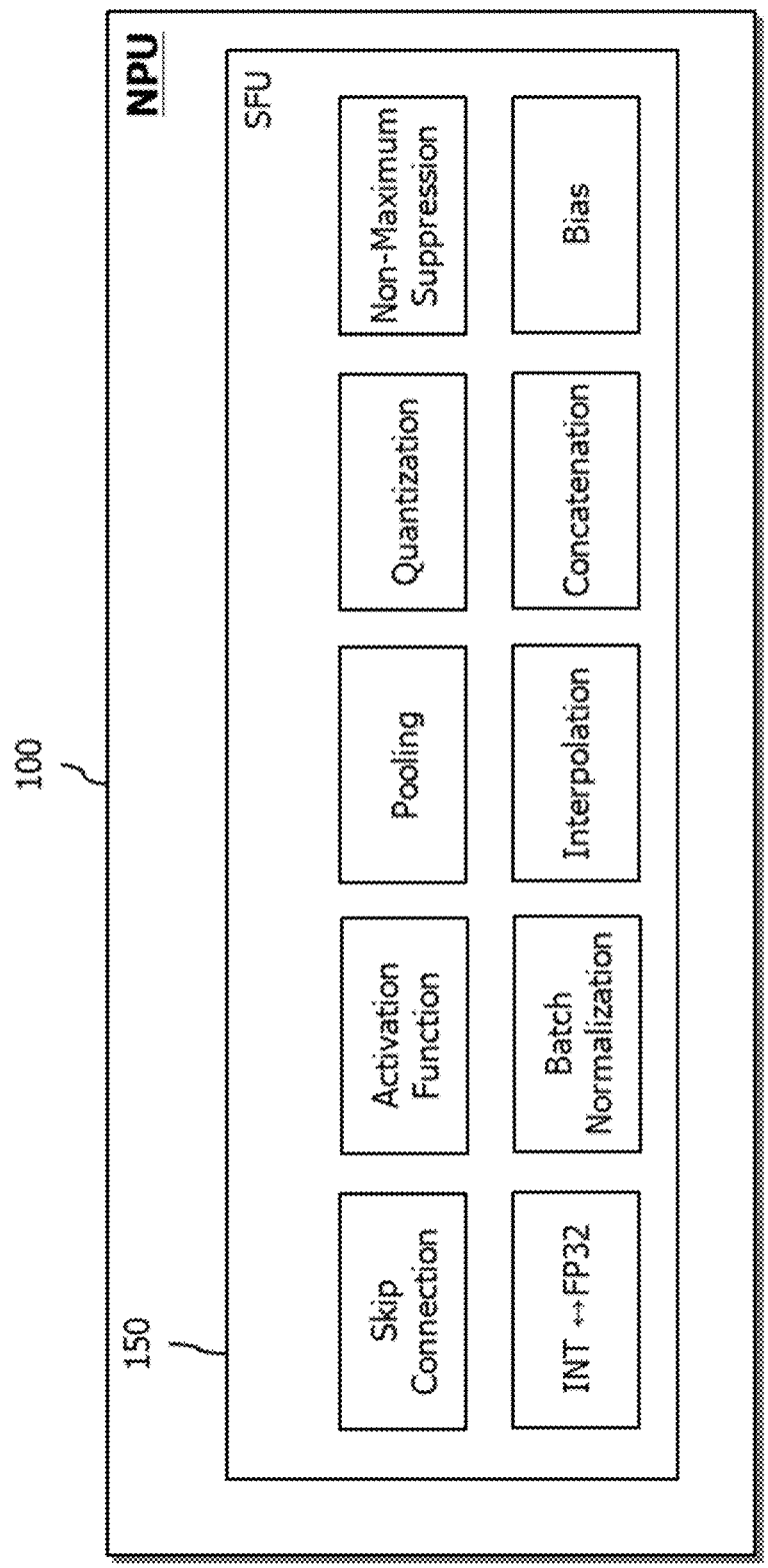
FIG. 4B is a schematic conceptual diagram illustrating an SFU that can be applied to an example of the present disclosure.

FIG. 4B is a schematic conceptual diagram illustrating an SFU that can be applied to an example of the present disclosure.

Referring to FIG. 4B, the SFU 150 may include several functional units. Each functional unit can be operated selectively. Each functional unit can be selectively turned on or turned off. That is, each functional unit can be set.

In other words, the SFU 150 may include various circuit units required for an artificial neural network inference operation.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. Data locality information of an artificial neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the neural processing unit 100 can be reduced. Meanwhile, in order to turn off some functional units, power gating may be used. Alternatively, clock gating may be performed to turn off some functional units.

Figure 5:
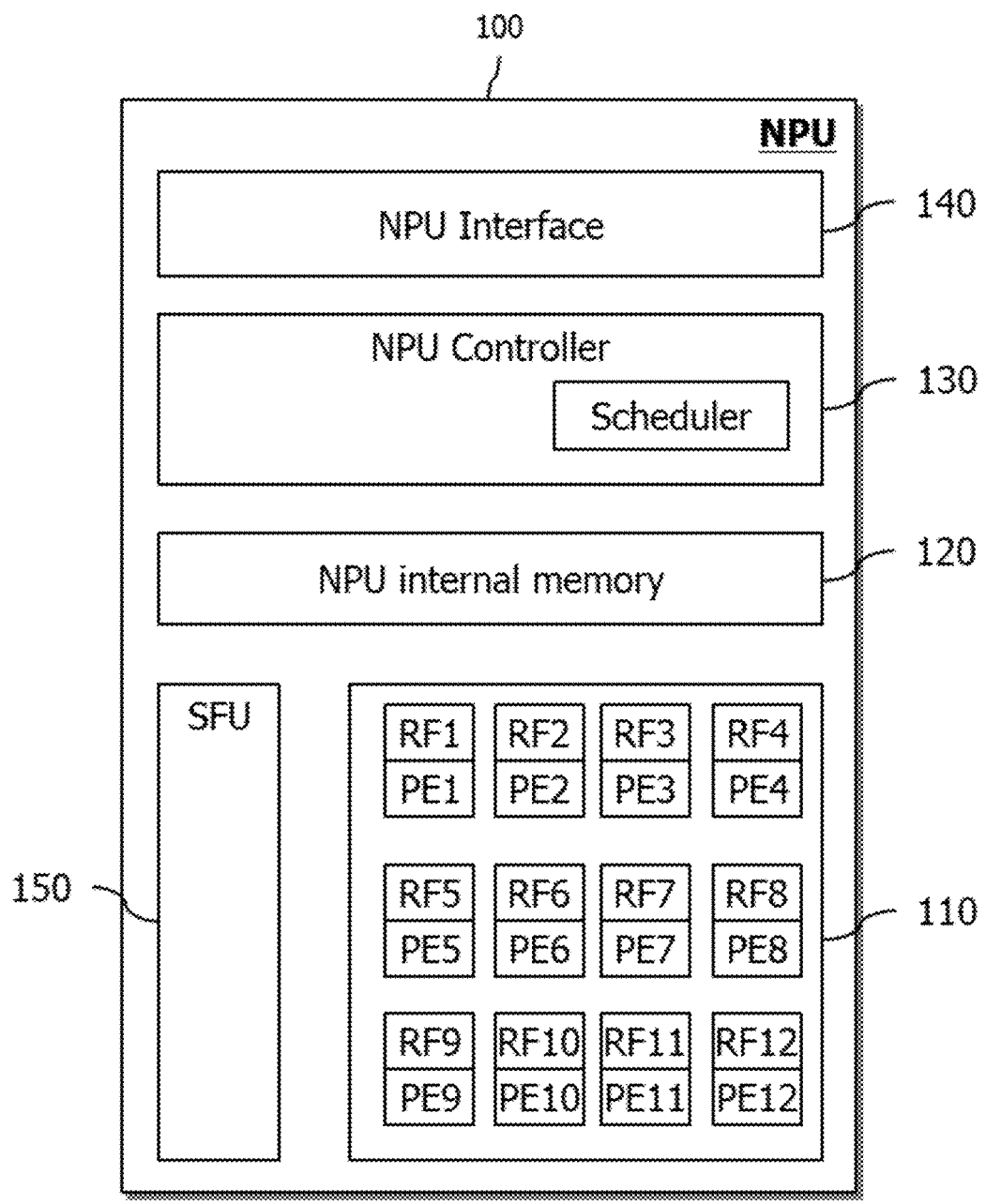
FIG. 5 is an exemplary diagram illustrating a modified example of the neural processing unit 100 shown in FIG. 3.

FIG. 5 illustrates a modified example of the neural processing unit 100 of FIG. 3.

The neural processing unit 100 of FIG. 5 is substantially the same as the neural processing unit 100 exemplarily illustrated in FIG. 3, except for the shown addition of the plurality of processing elements 110. Thus, redundant description will be omitted for the brevity.

The plurality of processing elements 110 exemplarily illustrated in FIG. 5 may further include register files RF1 to RF12, each of which corresponds to processing elements PE1 to PE12 respectively, in addition to a plurality of processing elements PE1 to PE12.

The plurality of processing elements PE1 to PE12 and the plurality of register files RF1 to RF12 of FIG. 5 are merely an example for the convenience of description and the number of the plurality of processing elements PE1 to PE12 and the plurality of register files RF1 to RF12 is not limited to 12 or any other integer number.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the neural processing unit 100 operates. For additional explanation, the memory size of the register file may be determined in consideration of a data size, a required operating speed, and a required power consumption of the artificial neural network model to operate.

The register files RF1 to RF12 of the neural processing unit 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

Technical Difficulties Found by the Inventors of the Present Disclosure

Depending on the purpose of the artificial intelligence service, several types of artificial neural network (ANN) models may exist. For example, when input data is an image or video, a CNN type artificial neural network model for object classification, object detection, object tracking, and the like in an image/video may be used for artificial intelligence service.

In general, an artificial neural network model may have a different amount of computation for each layer. This will be described with reference to FIGS. 6A and 6B.

Figure 6A:
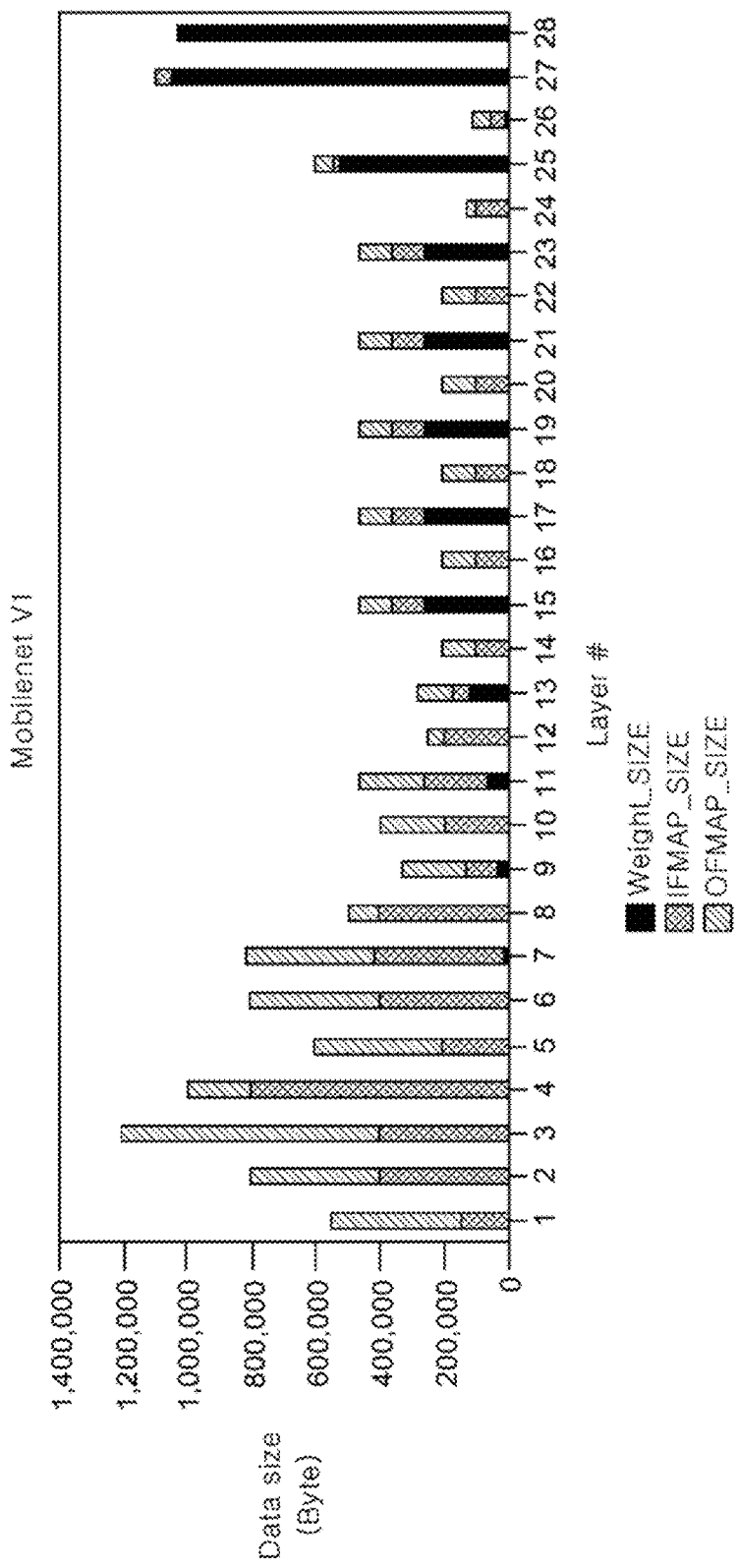
FIG. 6A is an exemplary view showing the size of data for each layer in the exemplary artificial neural network model.

FIG. 6A is an exemplary view showing the size of data for each layer in the exemplary artificial neural network model, and FIG. 6B is an exemplary table showing the size of data for each layer in the exemplary artificial neural network model shown in FIG. 6A.

The exemplary artificial neural network model shown in FIG. 6A is shown to be Mobilenet V1. The horizontal axis shown in FIG. 6A represents layers sequentially in the exemplary artificial neural network model, and the vertical axis represents the size of data.

Referring to layer 1 shown in FIG. 6A, it can be seen that the size of the output feature map OFMAP_SIZE is greater than the size of the input feature map IFMAP_SIZE.

The output feature map of the first layer is transferred to the second layer and becomes the input feature map of the second layer. When the calculation of the second layer is completed, an output feature map is output. The output feature map of the second layer is transferred to the third layer again, and becomes the input feature map of the third layer.

As such, the size of input data input to each layer and the size of an output feature map output from each layer may be different. Accordingly, the amount of calculation may be small in a certain layer, but the amount of calculation may be very large in another layer. In this way, as the amount of computation per layer is greatly fluctuated, a problem of managing power stability may occur.

Each layer may be divided into a plurality of computational steps and processed according to the number of processing elements in the neural processing unit and the capacity limitations of the NPU internal memory 120. Accordingly, the neural processing unit 100 may divide each layer into a plurality of tiles and schedule the plurality of computation steps to be processed. The scheduling may be performed by the compiler. For example, a layer may be divided into four tiles. Each tile may be processed sequentially by a neural processing unit. The compiled neural network model can store the computation order information determined when it is compiled in the scheduler. At this time, PE utilization information may be provided for each computation step.

The amount of computation of each layer can be known by MAC. It can be seen that the amount of computation for each layer differs by a maximum of 227 times.

The neural network processing unit 100 may determine the number of operating processing elements among the plurality of processing elements 110 in proportion to the MAC operation amount for each operation step of layers. In addition, power consumption may increase in proportion to the number of operating processing elements.

Here, knowing the number of processing elements utilized and the total number of processing elements, the utilization rate (%) of the neural processing unit 100 can be calculated.

Thus, the PE utilization rate may be calculated for each computation step of each layer of the artificial neural network model processed by the neural processing unit 100. Furthermore, unless the structure of the AI model processed by the neural processing unit 100 changes, the PE utilization rate for each computation step may be accurately predicted repeatedly. That is, the neural processing unit 100 may repeatedly infer a particular AI model. In such a case, the inventors of the present disclosure recognize that the neural processing unit 100 may repeatedly use the same weight parameters and the same network layer structure.

Also, the greater the difference in MAC computation between adjacent layers, the greater the variation in peak power between adjacent layers. The greater the difference in peak power between neighboring layers, the more the supply voltage (VDD) may fluctuate. At this time, the inventors of the present disclosure have recognized that the drive frequency can be varied in consideration of the stability of the supply voltage (VDD).

In particular, the inventors of the present disclosure recognized that a significant increase in the amount of computation in a particular layer's computational step can result in an increase in instantaneous power consumption, thereby deteriorating system stability.

For example, many processing elements may be operated at the same time for the operation of a certain computational step of a specific layer. A certain amount of power is required to drive each processing element, and when a considerable number of processing elements are simultaneously driven, the required power may rapidly increase. If the neural processing unit is designed specifically for low-power operation, the power supply capability may be relatively less than that of the neural processing unit for a server. Accordingly, such a neural processing unit for an edge device may be relatively more vulnerable to an instantaneous power supply issue, and a supply voltage VDD may fluctuate when the power supply amount increases exponentially. Thus, data stored in the transistor may be lost, especially if the supply voltage VDD drops below the threshold voltage of the transistor. In other words, when the supply voltage VDD is lowered, setup/hold violation problems may occur in the neural processing unit, resulting in malfunction. This can be especially true as the semiconductor foundry's processes go lower, such as 3 nm, 4 nm, 5 nm, and 7 nm.

For another example, the inventors of the present disclosure have recognized that since the plurality of PEs 110 that perform operations for an artificial neural network, for example, add, multiply, and accumulate instantaneously consume a lot of power, sufficient power may not be supplied to other components in the neural processing unit, for example, the internal memory 120. Specifically, the inventors of the present disclosure have recognized that there may be a problem that cannot be ruled out that, if sufficient power is not supplied to the internal memory 120, the possibility of compromising stored data bits may occur.

Furthermore, the inventors of the present disclosure have recognized that when the utilization of PEs is low in a particular computational step, the voltage stability of the neural processing unit can be ensured even if the drive frequency of the neural processing unit is increased.

Disclosures of the Present Disclosure

The inventors of the present disclosure have recognized that the above-mentioned problem may be occurred due to a clock signal supplied to a hardware for performing calculations of the artificial neural network model.

Thus, the inventors of the present disclosure invented a technique for lowering peak power by dividing the plurality of PEs in the NPU into PEs of a first group and PEs of a second group and operating them according to different clock signals.

The examples in which the techniques disclosed by the inventors of the present disclosure will be described with reference to the drawings.

Figure 7A:
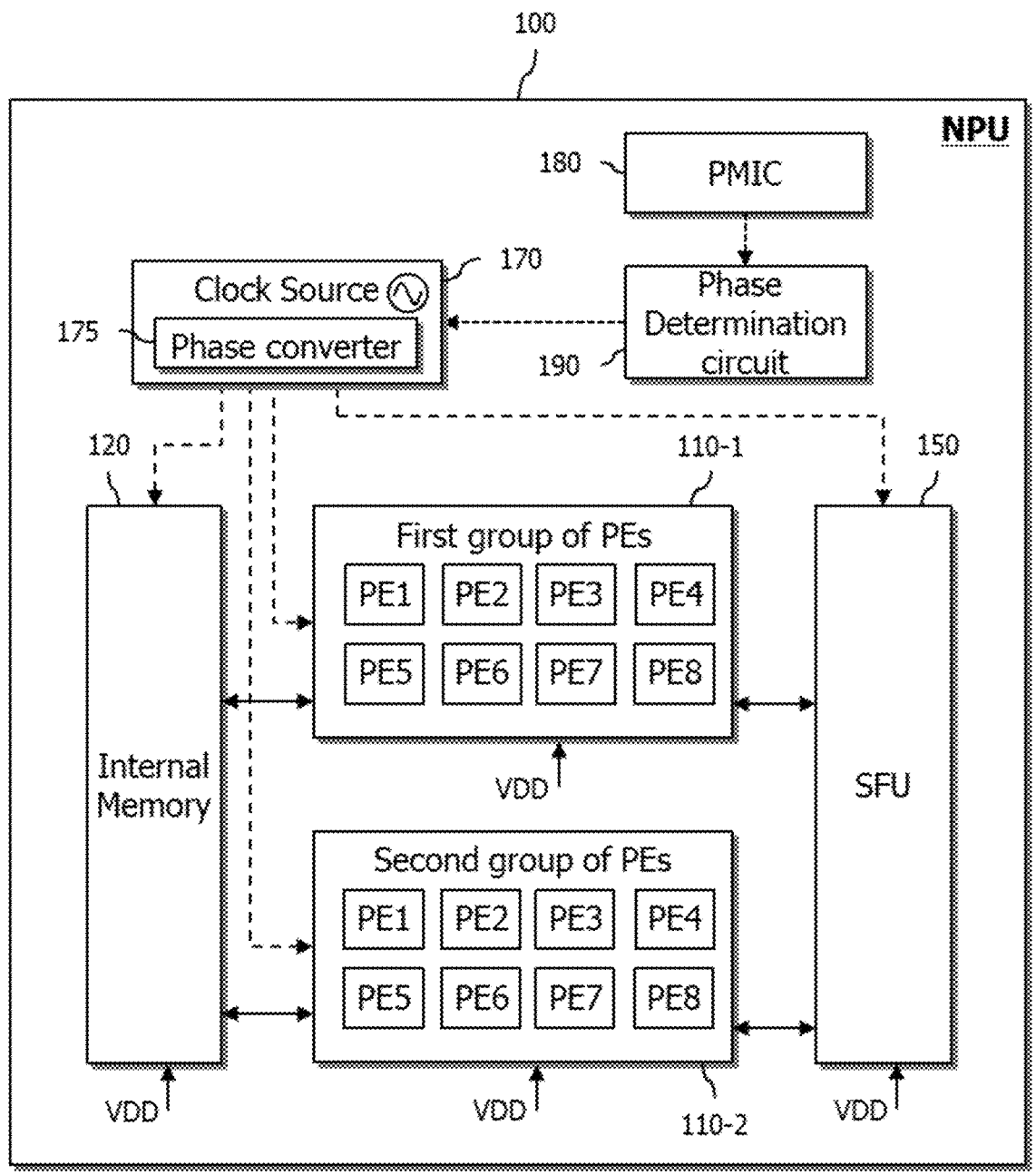
FIG. 7A is an exemplary diagram showing the structure of an NPU according to an example of the present disclosure.

FIG. 7A is an exemplary diagram showing the structure of an NPU according to an example of the present disclosure.

In FIG. 7A, the NPU 100 is shown to include a first group of PEs 110-1, a second group of PEs 110-2, internal memory 120, an SFU 150, a clock source 170, a power management integrated circuit (PMIC) 180, and a phase determination circuit 190.

In some examples, the NPU 100 may further include an NPU controller 130 and an NPU interface 140, as shown in FIG. 3 or FIG. 5.

The plurality of PEs may be categorized as a first group of PEs 110-1 and a second group of PEs 110-2.

The plurality of PEs may also be referred to as NPU cores, NPU engines, NPU threads, and the like. The NPU core, NPU engine, NPU thread, and the like may be a semiconductor circuit having a number of transistors connected thereto.

Figure 8A:
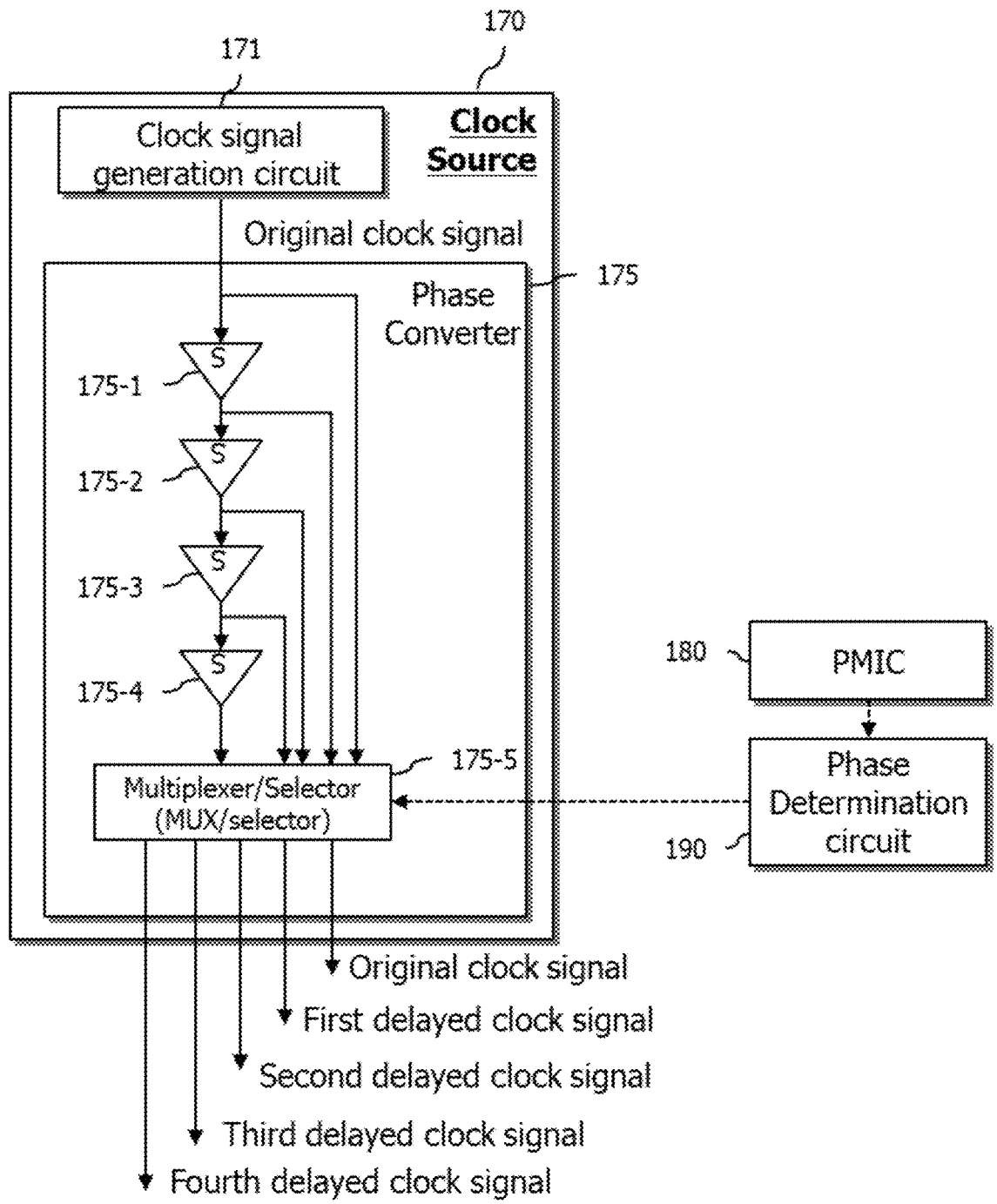
FIG. 8A is an exemplary diagram showing the clock source 170 shown in FIG. 7A or 7B in detail according to an example.

Each of the PEs 110-1 of the first group, the PEs 110-02 of the second group, the internal memory 120, the NPU controller 130, the NPU interface 140, the SFU 150, the clock source 170, the PMIC 180, and the phase determination circuit 190 may be semiconductor circuits with numerous transistors connected thereto. As such, some of them may be difficult to identify and distinguish with the naked eye, and may be identified only by their behavior. The clock source 170 may include a clock signal generation circuit 171 and a phase converter 175, as shown in FIG. 8A, which will be described later.

For example, the PEs 110-1 of the first group and the PEs 110-2 of the second group may be referred to as the first circuit.

For example, the clock source 170 including the phase converter 175 may be referred to as the second circuit.

For example, the PMIC 180 may be referred to as the third circuit.

For example, the phase determination circuit 190 may be referred to as the fourth circuit.

However, the examples of the present disclosure are not limited, and any of the circuits may be operated by the plurality of PEs 110, or by the NPU controller 130.

The first group of PEs 110-1 and the second group of PEs 110-2 shown in FIG. 7A should be understood as being divided into a plurality of PEs 110 shown in FIG. 3 or 5. Although the number of PEs belonging to each group is illustrated as eight groups as an example in FIG. 7A, and it will be apparent that the number of PEs belonging to each group may vary. In addition, the number of PEs allocated to each group can be changed semi-fixedly or dynamically. For example, a first group of PEs 110-1 may include ten of PEs, and a second group of PEs 110-2 may include six of PEs. This change may be performed under the control of the NPU controller 130.

The PMIC 180 may be a circuit configured to measure the power of at least one circuit of the NPU 100.

For example, the PMIC 180 may be configured to measure the power of the first group of PEs 110-1 at runtime. For example, the PMIC 180 may be configured to measure the power of the PEs 110-1 of the second group at runtime. For example, the PMIC 180 may be configured to measure the power of the internal memory 120 at runtime. For example, the PMIC 180 may be configured to measure the power of the SFU 150 at runtime. However, the examples of the present disclosure are not limited to this and may be configured to measure the power of various circuits.

The PMIC 180 may be configured to measure instantaneous power in real time. The instantaneous power having a maximum value may be defined as the peak power. PMIC 180 may be configured to measure average power over a period of time.

As described further below, PMIC 180 may be configured to measure peak power and average power. The PMIC 180 can store a peak power value that occurs over a short period of time. It may also measure average power based on an integral of the measured power over a period of time. The PMIC 180 can provide power values at runtime in the form of a graph along a time axis.

Here, even if the average power is the same over a period of time, if the peak power is relatively larger, the stability of the supply voltage (VDD) may be relatively more unstable.

Accordingly, the phase determination circuit 190 may be a circuit designed to calculate a ratio of the average power measured by the PMIC 180 over a period of time to the average power of the peak power during that period. However, the examples of the present disclosure are not limited thereto, and the ratio calculation may be performed in the PMIC 180 or other circuitry.

If the peak power is 1 W and the average power is 1 W, the ratio of the peak power to the average power could be 1:1, meaning that the ratio of the peak power to the average power could be 100% over a certain period of time.

If the peak power is 1 W and the average power is 2 W, the ratio of the peak power to the average power can be 2:1. That is, the ratio of the peak power to the average power can be 200% over a period of time.

If the peak power is 1 W and the average power is 3 W, the ratio of the peak power to the average power may be 3:1. That is, the ratio of the peak power to the average power may be 300% over a period of time.

In other words, the phase determination circuit 190 may determine that as the ratio of the peak power to the average power increases, the stability of the supply voltage (VDD) becomes unstable.

That is, the PMIC 180 can provide the phase determination circuit 190 with data on the ratio of average power to peak power over a specific time period during the runtime of the NPU 100.

The average power value and peak power value measured in the PMIC 180 may be stored in a specific memory, register file, or the like. For example, the measured average power value, the peak power value, and/or the ratio value of the peak power to the average power may be stored in the phase determination circuitry 190. However, examples of the present disclosure are not limited thereto.

In some examples, the power of the plurality of PEs can be increased based on the utilization of the plurality of PEs. In other words, the power of the PEs may increase proportionally to the utilization of the PEs. These characteristics are further illustrated in FIGS. 11 and 12. Thus, the phase determination circuit 190 may also infer the utilization of the plurality of PEs based on the measured power in the PMIC 180. Further, when provided with information about the number of PEs and the power consumption of each PE, the phase determination circuit 190 can more accurately predict the utilization of the PEs based on the power measured by the PMIC 180. Thus, the phase determination circuit 190 can adjust the phase of at least one of the plurality of clock signals supplied to the PEs in each group to reduce peak power as the utilization of the PE groups increases.

For example, the PMIC 180 may measure a first peak power value of the plurality of PE groups 110-1, 110-2, and the PMIC 180 may provide the first peak power value to the phase determination circuit 190. Accordingly, the phase determination circuit 190 may correct the phase of at least one of the plurality of clock signals. The PMIC 180 may then measure the second peak power value of the plurality of PE groups 110-1, 110-2 again, and the phase determination circuitry 190 may be configured to determine whether the second peak power value is less than the first peak power value.

In some examples, the phase determination circuit 190 may obtain information about the amount of computation or utilization of the plurality of PE groups 110-1, 110-2 for a particular computational step of a particular ANN model being processed by the plurality of PE groups 110-1, 110-2. Here, the phase determination circuit 190 may be configured to generate a control signal based on the information about the amount of computation or the utilization of the plurality of PE groups 110-1, 110-2 for a particular computation step of a particular ANN model processed by the plurality of PE groups 110-1, 110-2. That is, an IR-drop margin may be predicted based on the utilization of the plurality of PE groups 110-1, 110-2 for a particular computation step of a particular ANN model. Therefore, when the IR-drop margin is expected to fall below a threshold value, the control signal may be determined based on the utilization rate of the plurality of PE groups 110-1, 110-2 and the IR-drop margin to secure the IR-drop margin.

In some examples, the phase determination circuitry 190 may dynamically adjust the phase of at least one of the plurality of clock signals.

In some examples, the phase determination circuit 190 may adjust the phase of at least one of the plurality of clock signals to have a preset phase difference based on a preset threshold power value. The threshold power value may be set by considering a peak power characteristic based on utilization of the PE and a peak power reduction characteristic based on the phase difference. For example, if the peak power value measured by the PMIC 180 is higher than the threshold power value, the phase determination circuit 190 may be configured to dynamically adjust the phase of at least one of the plurality of clock signals. For example, the phase of the at least one of the plurality of clock signals may be adjusted based on a predetermined threshold power value based on utilization of the plurality of PE groups.

The clock source 170 may be a circuit configured to output one or more clock signals.

In order to reduce the peak power of the NPU 100, the phase determination circuit 190 may generate a control signal for calibrating or adjusting at least one phase of the one or more clock signals to be output by the clock source 170, based on a ratio of the peak power to the average power. The control signal may be input to the phase determination circuitry 190.

Figure 11:
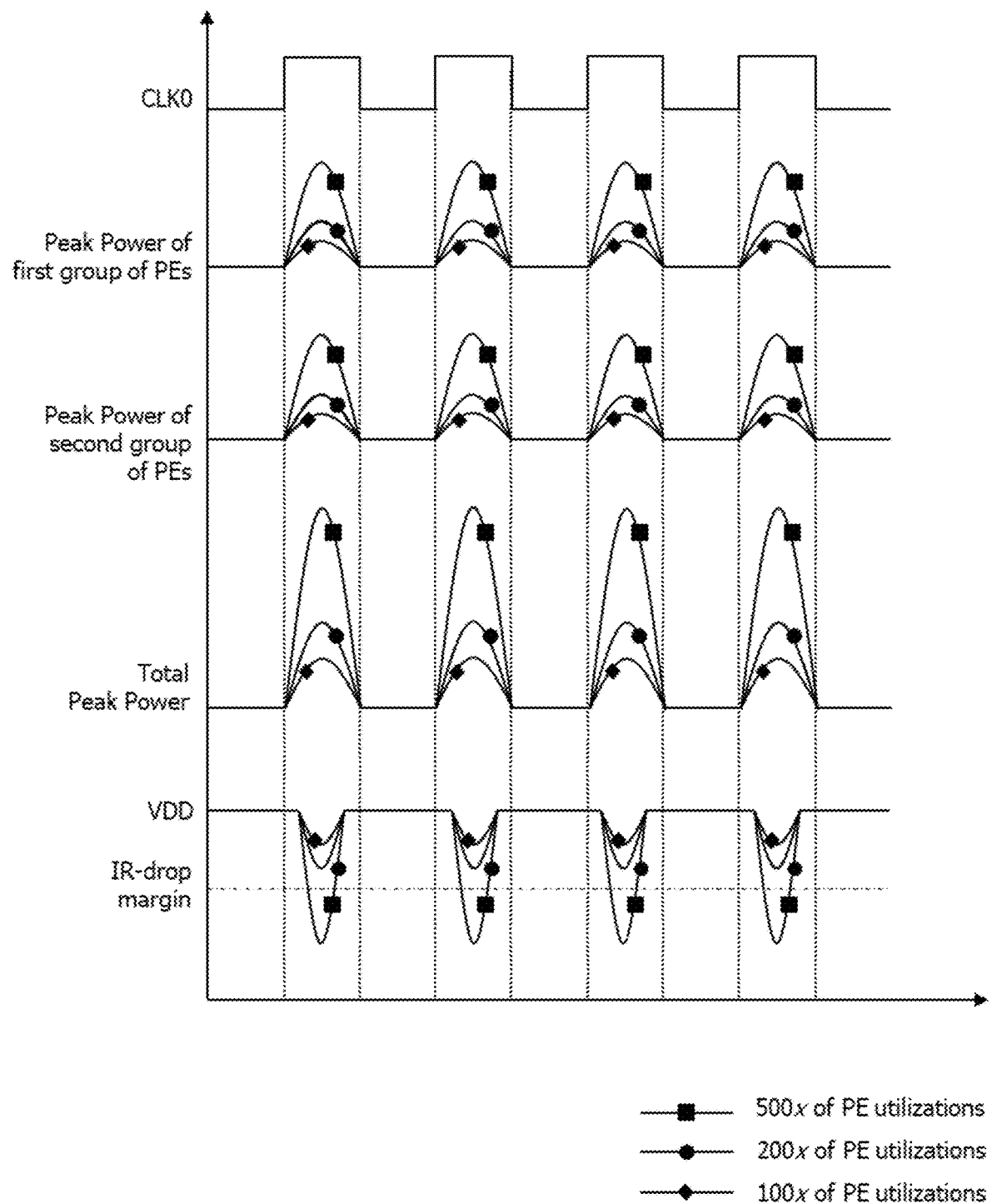
FIG. 11 illustrates an example of not inputting clock signals of different phases to the plurality of PEs of the NPU.
Figure 12:
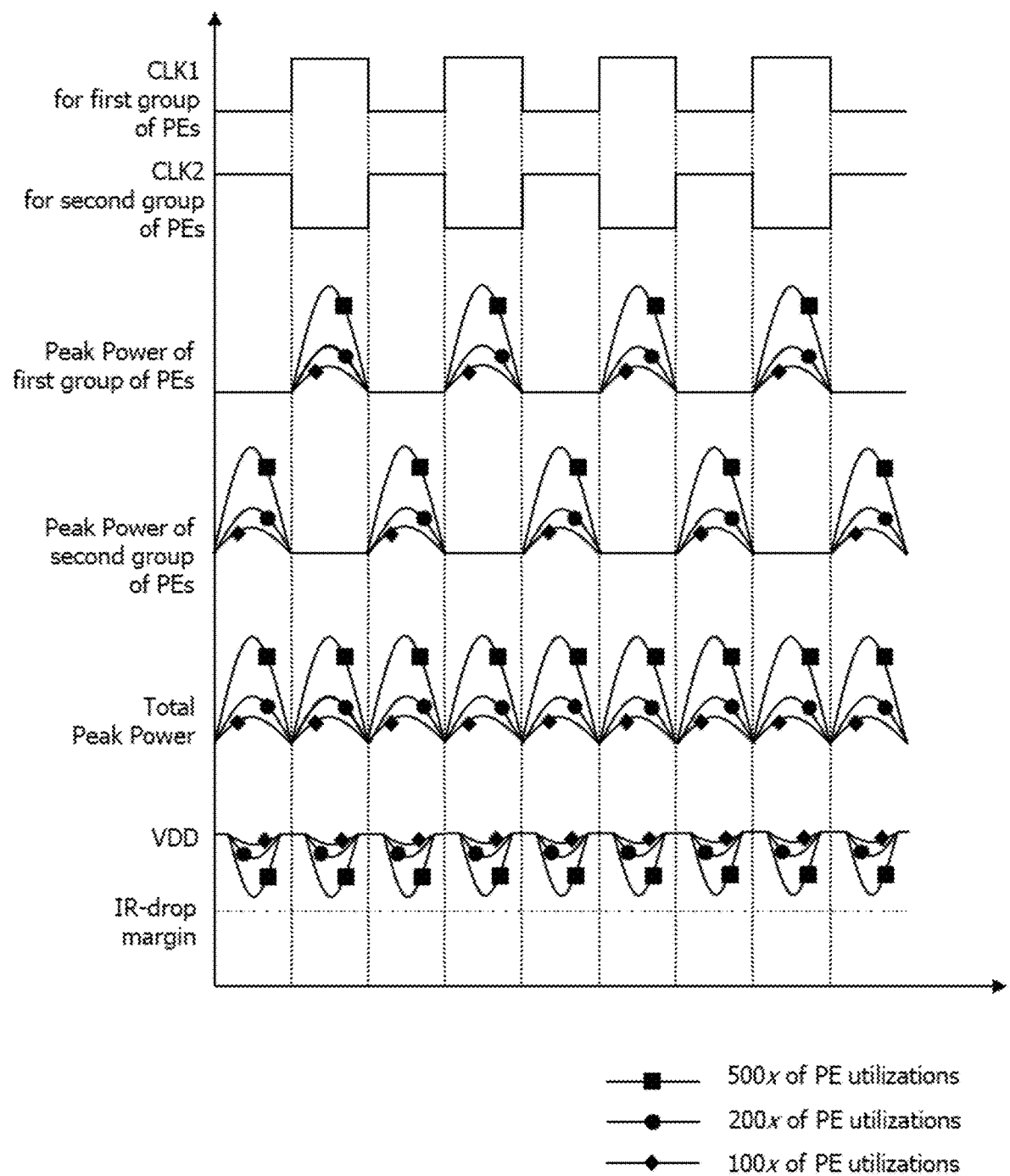
FIG. 12 illustrates an example of inputting clock signals of different phases to a plurality of PEs of the NPU in consideration of peak power, according to an example of the present disclosure.

FIGS. 11 and 12, which will be described later, illustrate an example and comparative example of the present disclosure for reducing peak power by shifting at least one phase of a plurality of clock signals, even if the average power is the same.

Then, the clock source 170 may dynamically adjust the phase of at least one of the plurality of clock signals to output in response to a control signal from the phase determination circuit 190. The phase of the at least one of the plurality of clock signals may be adjusted based on a ratio of a peak power and an average power of the plurality of PEs.

For example, if a ratio of peak power to average power is measured to be higher than previously, in order to reduce the peak power, in response to a control signal from the phase determination circuitry 190, the clock source 170 may output a phase-delayed clock signal, which shifts or drifts the phase of the original clock signal.

After outputting the phase delay clock signal, the phase determination circuit 190 may compare the stored peak power value with the measured peak power value after phase correction.

If the peak power value measured after the phase correction is lower than the original peak power value, the phase delay determination circuit 190 may determine that the phase correction was successful. Therefore, the phase determination circuit 190 may continue to maintain the corrected phase difference.

If the measured peak power value after the phase correction is higher than the original peak power value, the phase delay determination circuit 190 may determine that the phase correction was unsuccessful. Accordingly, the phase determination circuit 190 may revert to the previous phase.

The unit of phase correction can be performed in a unit of one inference. Specifically, for a one-time inference of a particular artificial neural network model, the measured average power may be the same, even if a plurality of clocks input to the plurality of PE groups are in the same or different phases. However, the peak power may vary depending on the phase. Therefore, the phase determination circuit 190 may input control signals that cause various phase differences to the clock source 170 to derive the phase difference with the lowest value of peak power.

Here, one inference may refer to processing all operations from the input layer to the output layer of the artificial neural network model, that is, one inference may be referred to as an inference of one image frame. Therefore, the phase correction can be performed in units of at least one image frame or in units of one inference.

For example, 10 control signals with 10 different phases can be input to the clock source 170 for each image frame. Thus, the phase determination circuit 190 can measure the peak power for each phase for 10 frames. As a result, the phase determination circuit 190 can derive an optimal phase difference of the plurality of clock signals based on the results measured over the 10 frames. The resulting optimal phase difference may be stored in the phase determination circuit 190.

The phase determination circuitry 190 may maintain the phase difference until the artificial neural network model processed by the NPU 100 is replaced. If the peak power increases, the phase determination circuit 190 may perform phase correction of the clock of at least one of the plurality of clock signals again. If the artificial neural network model is replaced, the phase determination circuit 190 may be configured to perform the phase correction step again.

The clock source 170 may include a clock signal generation circuit 171 and a phase converter 175, as shown in FIG. 8A. The clock signal generation circuit 171 may include an oscillator. Further, the oscillator may include a pulse width modulator (PWM). The PWM may adjust the ratio of high and low signals by changing the duty cycle of the clock.

When the clock signal generation circuit 171 within the clock source 170 generates and outputs a raw clock signal, depending on the control signal from the phase determination circuit 190, the phase converter 175 within the clock source 170 may output the original clock signal as is, or may output the phase of the original clock signal by delaying or shifting the phase of the original clock signal.

For example, in response to the control signal from the phase determination circuit 190, the phase converter 175 within the clock source 170 may be operated. The phase converter 175 may bypass the original clock signal generated by the clock signal generation circuit 171 and pass it to the first group of PEs 110-1. Alternatively, the phase converter 175 may deliver to the first group of PEs 110-1 a first delayed clock signal in which the clock signal generation circuit 171 has delayed or shifted the phase of the original clock signal. Further, based on the control signal from the phase determination circuit 190, the phase converter 175 may deliver a second delayed clock signal in which the clock signal generation circuit 171 has delayed or shifted the phase of the original clock signal to the second group of PEs 110-2.

As described above, an example of the present disclosure divides the plurality of PEs 110 shown in FIG. 3 or FIG. 5 into a first group of PEs 110-1 and a second group of PEs 110-2 as shown in FIG. 7A, and then causes the first group of PEs 110-1 and the second group of PEs 110-2 to operate distributedly according to different clock signals, so that the peak power of the plurality of PE groups 110-1, 110-2 can be lowered.

In addition, an example of the present disclosure may lower manufacturing costs by simply adding a phase converter 175 rather than multiple clock sources 170 to provide multiple clock signals with different phases.

Figure 7B:
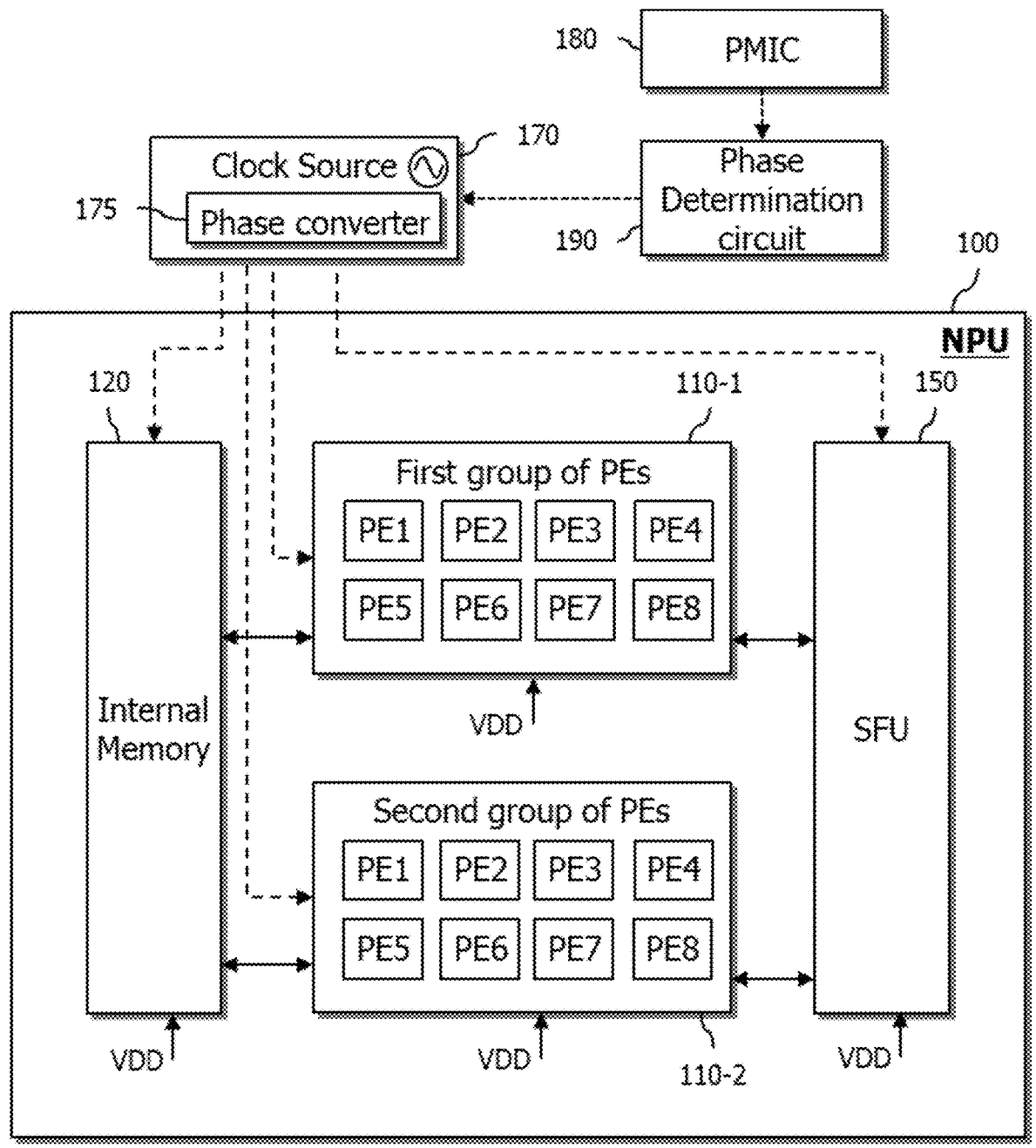
FIG. 7B is an exemplary view showing the structure of an NPU according to another example of the present disclosure.

FIG. 7B is an exemplary view showing the structure of an NPU according to an example of the present disclosure.

In FIG. 7B, the neural processing unit 100 is illustrated as including a first group of PEs 110-1, a second group of PEs 110-2, an internal memory 120, and an SFU 150. In addition, the neural processing unit 100 may further include an NPU controller 130 and an NPU interface 140 as shown in FIG. 3 or 5.

Each of the first group of PEs 110-1, the second group of PEs 110-2, the internal memory 120, the NPU controller 130, the NPU interface 140, and the SFUs 150 may be a semiconductor circuit in which numerous transistors are connected. Accordingly, some of them may be difficult to discern and distinguish with the naked eye, and may only be identified by operation thereof.

Referring to FIG. 7B, the clock source 170, the PMIC 180, and the phase determination circuit 190 are shown to be located outside the neural processing unit 100. Other than that, since it is the same as that shown in FIG. 7A, FIG. 7B will not be separately described, and the contents described with reference to FIG. 7A will be used as they are.

Meanwhile, the internal memory 120 and the SFU 150 shown in FIGS. 7A and 7B also operate according to a clock signal (e.g., an original clock signal or a phase delayed clock signal) output from the phase converter 175.

On the other hand, when the first group of PEs 110-1 and the second group of PEs 110-2, shown in FIGS. 7A and 7B, complete the operation of an arbitrary layer of the artificial neural network model, the first group of PEs 110-1 and the second group of PEs 110-2 may respectively output an output feature map according to the clock signals respectively provided from the phase converter 175. Specifically, the first group of PEs 110-1 may output a first output feature map according to an arbitrary clock signal (e.g., the original clock signal or the first delayed clock signal) provided from the phase converter 175. Similarly, the second group of PEs 110-2 may output a second output feature map according to an arbitrary clock signal (e.g., a second delayed clock signal) provided from the phase converter 175.

When the first output feature map output by the first group of PEs 110-1 and the second output feature map output by the second group of PEs 110-2 are independent from each other, the SFU 150 may first process an output feature map received first in a first input first output (FIFO) method.

Meanwhile, although not shown in FIGS. 7A and 7B, the SFU 150 may be directly connected to the NPU internal memory 120.

Each element within the NPU 100 illustrated in FIGS. 7A and 7B may have a supply voltage (VDD) input.

Although a common supply voltage (VDD) is illustrated in FIGS. 7A and 7B, examples of the present disclosure are not limited thereto.

In some examples, each element of the NPU 100 may be configured to have an independent and/or separate supply voltage (VDD).

In some examples, each element within the NPU 100 may be configured to have an independent or separate supply voltage (VDD).

In some examples, certain elements within the NPU 100 may be configured to have a second supply voltage input that is different from the first supply voltage.

On the other hand, when the first group of PEs 110-1 and the second group of PEs 110-2 illustrated in FIGS. 7A and 7B have completed performing the operation on any layer of the artificial neural network model, the first group of PEs 110-1 and the second group of PEs 110-2 may output the result of the operation, i.e., the output feature map, in accordance with any one of the first portion and the second portion of the clock. To this end, at least one of the first group of PEs 110-1 and the second group of PEs 110-2 may further comprise a time delay buffer (e.g., a shift register). The time delay buffer (e.g., shift register) may perform a time delay, such that the output is performed in time with the temporally later of the first portion and the second portion of the clock.

For example, the output ports of the PEs 110-2 of the second group may be connected to a time-delay buffer (e.g., a shift register).

Alternatively, the first group of PEs 110-1 illustrated in FIGS. 7A and 7B may output a first output feature map according to a first portion of the clock, and the second group of PEs 110-2 may output a second output feature map according to a second portion of the clock. In this case, the SFU 150 may include a time delay buffer (e.g., a shift register). The SFU 150 may time-delay the output feature maps received faster during the first and second portions of the clock so that the timing is synchronized with the output feature maps received slower during the first and second portions of the clock.

Alternatively, if the first output feature map output by the first group of PEs 110-1 and the second output feature map output by the second group of PEs 110-2 are independent of each other and not dependent on each other, the SFU 150 may process the received output feature map first, in accordance with the temporally earlier of the first and second portions of the clock.

That is, the first output from the first group of PEs 110-1 and the second output from the second group of PEs 110-2 may be delivered relative to the first part of the clock.

The reference phase for the second group of PEs 110-2 may be converted from the second portion of the clock to the first portion.

On the other hand, although not shown in FIGS. 7a and 7b, the SFU 150 may be directly connected to the NPU internal memory 120.

On the other hand, although the NPU has been described in FIGS. 7A and 7B, the NPU may be implemented in a SoC form.

Figure 8B:
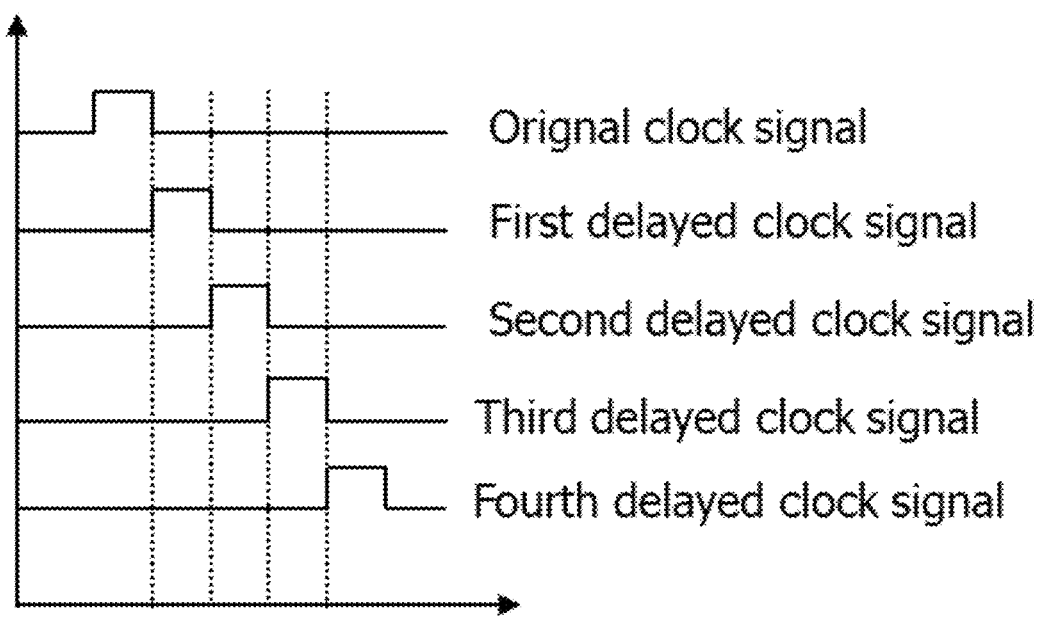
FIG. 8B is an illustration of a plurality of clock signals output by clock source 170.

FIG. 8A is a detailed illustration of a clock source 170 shown in FIG. 7A or FIG. 7B, according to an example, and FIG. 8B is an illustration of a plurality of clock signals output by the clock source 170. As shown in FIG. 8A, the clock source may include clock signal generation circuit 170 and a phase converter 175.

The phase converter 175 may include a plurality of shifters S and a multiplexer/selector (MUX/selector) 175-5. In FIG. 8a, there are exemplarily shown to be four shifters S, 175-1, 175-2, 175-3, and 175-4.

Hereinafter, FIGS. 8A and 8B will be described with reference to each other.

The source clock signal output from the clock signal generation circuit 171 may be bypassed within the phase converter 175 and output through the MUX/Selector 175-5.

Further, the source clock signal output from the clock signal generation circuit 171 may be converted into a first delayed clock signal by being delayed in phase once through the first shifter 175-1 within the phase converter 175, and then output through the multiplexer/selector (MUX/Selector) 175-5.

Then, the source clock signal output from the clock signal generation circuit 171 may be converted into a second delayed clock signal by being delayed twice in phase through the first shifter 175-1 and the second shifter 175-2 in the phase converter 175, and then output through the MUX/Selector 175-5.

Then, the source clock signal output from the clock signal generation circuit 171 may be converted into a third delay clock signal by being delayed in phase three times through the first shifter 175-1, the second shifter 175-2, and the third shifter 175-3 in the phase converter 175, and then output through the MUX/Selector 175-5.

Similarly, the source clock signal output from the clock signal generation circuit 171 may be converted into a four-time delayed clock signal by being delayed in phase four times via the first shifter 175-1, the second shifter 175-2, the third shifter 175-3, and the fourth shifter 175-4 in the phase converter 175, and then output via the said multiplexer/selector (MUX/Selector) 175-5.

Based on the control signal from the phase determination circuit 190, the multiplexer/selector (MUX/Selector) 175-5 may multiplex the plurality of clock signals (i.e., the raw clock signal, the first delayed clock signal, the second delayed clock signal, the third delayed clock signal, and the fourth delayed clock signal), as shown in FIG. 8B, and then selectively provide one clock signal to each portion within the NPU.

For example, based on the control signal from the phase determination circuit 190, the MUX/Selector 175-5 may provide the source clock signal to the internal memory 120, the first delayed clock signal to the PEs 110-1 of the first group, the second delayed clock signal to the PEs 110-2 of the second group, and the third delayed clock signal to the SFU 150. In this way, by operating each portion of said NPU according to multiple clock signals that are out of phase with each other, a sudden increase in peak power may be suppressed.

In some examples of the present disclosure, the clock source 170 may be a circuit including at least one of a clock skipper circuit, a clock divider circuit, a clock gating, an oscillator, a phase loop (PLL) circuit, and a selector. The clock source 170 may be a circuit that combines at least two of a clock skipper circuit, a clock divider circuit, a clock gating circuit, an oscillator circuit, a phase loop circuit, and a selector. However, the examples of the present disclosure are not limited thereto.

Figure 9:
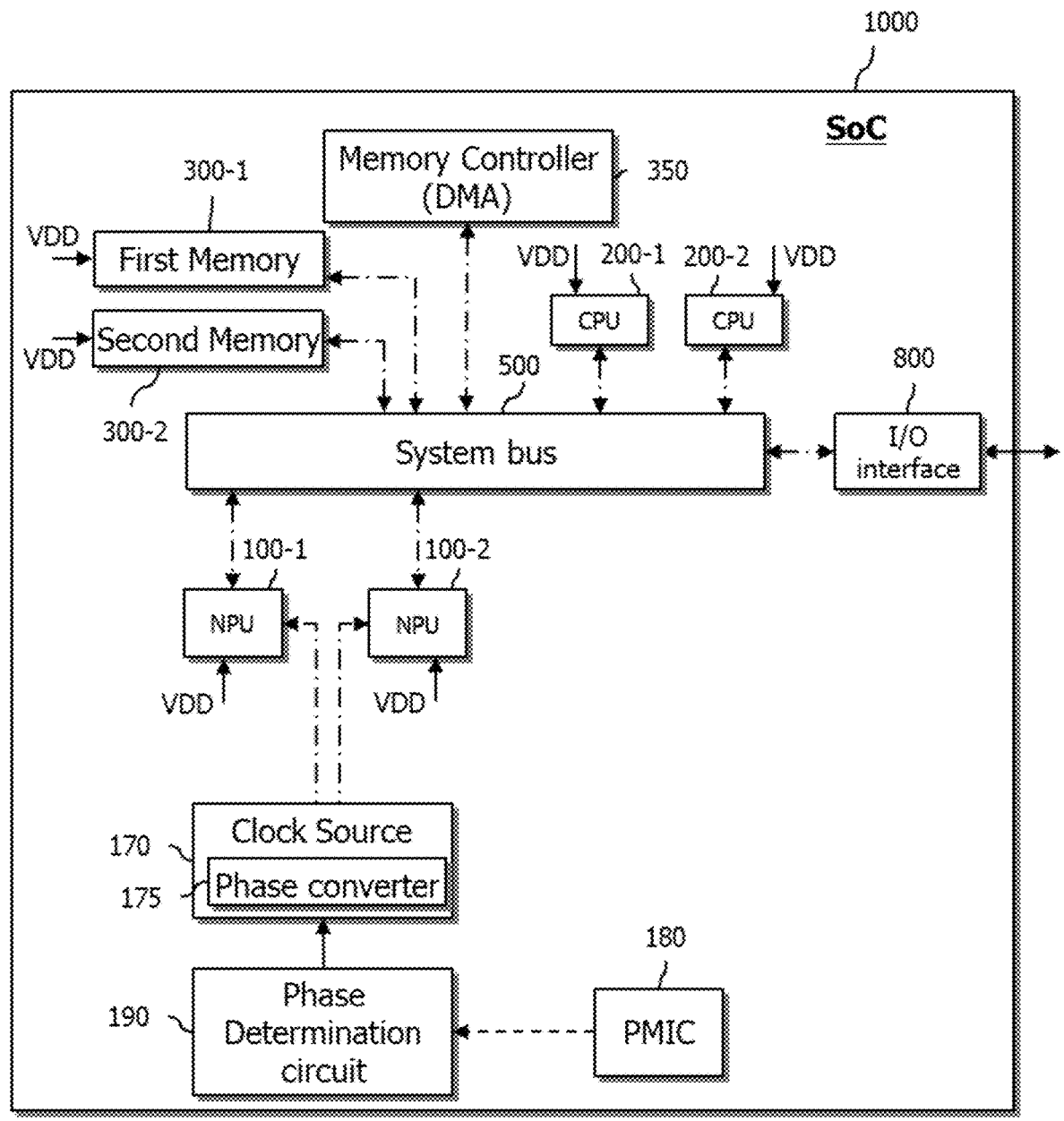
FIG. 9 is an illustrative diagram of a structure of an SoC according to one example of the present disclosure.

FIG. 9 is an exemplary diagram illustrating a structure of an SoC according to an example of the present disclosure.

Referring to FIG. 9, an exemplary SoC 1000 may include a plurality of NPUs, a plurality of central processing units (CPUs), and a plurality of memories. The plurality of NPUs may include, for example, a first neural processing unit 100-1 and a second neural processing unit 100-2. Also, the plurality of CPUs may include, for example, a first CPU 200-1 and a second CPU 200-2. The plurality of memories may include a first memory 300-1 and a second memory 300-2.

Referring to FIGS. 7A and 7B, each of the plurality of NPUs (e.g., the first NPU 100-1 and the second NPU 100-2) may include a first group of PEs and a second group of PEs.

In FIG. 9, the number of the plurality of NPUs, the plurality of CPUs, and the plurality of memories is shown as two, respectively, but is not limited thereto, and the number may be variously modified such as four, six, eight, and the like.

The exemplary SoC 1000 may include a memory controller 350, a clock source 170, a phase shifter 175, a system bus 500, and an input output (I/O) interface 800.

The system bus 500 may be implemented by an electrically conductive pattern formed on a semiconductor die. The system bus enables high-speed communication. For example, the plurality of NPUs, the plurality of CPUs, the plurality of memories, and the memory controller 350 may communicate with each other through the system bus 500.

The plurality of NPUs and the plurality of CPUs make requests to the memory controller 350 via the system bus 500, whereby the memory controller 350 may read and/or write data from at least one of the plurality of memories.

In FIG. 9, the clock source 170, the PMIC 180, and the phase determination circuit 190 are the same as those shown in FIGS. 7A, 7B, and 8A.

Accordingly, based on a control signal from the phase determination circuit 190, the clock source 170 may provide a raw clock signal to the first group of PEs in the first NPU 100-1 and a first phase delayed clock signal in which the phase of the raw clock signal is delayed once to the second group of PEs in the first NPU 100-1. Alternatively, based on a control signal from the phase determination circuit 190, the clock source 170 may provide a first phase-delayed clock signal in which the phase of the original clock signal from the clock source 170 is delayed by a certain phase difference to the first group of PEs in the first NPU 100-1, and a second phase-delayed clock signal in which the phase of the original clock signal is delayed twice to the second group of PEs in the first NPU 100-1.

Similarly, based on a control signal from the phase determination circuit 190, the clock source 170 may provide the source clock signal to the first group of PEs in the second NPU 100-2, and further provide the second phase delayed clock signal in which the phase of the source clock signal is delayed once to the second group of PEs in the second NPU 100-2. Alternatively, in response to a control signal from the phase determination circuit 190, the clock source 170 may provide a first phase delayed clock signal having a phase of the original clock signal delayed once to the first group of PEs in the second NPU 100-2, and a second phase delayed clock signal having a phase of the original clock signal delayed twice to the second group of PEs in the second NPU 100-2.

Each element (i.e., NPU, memory, and CPU) within the SoC 1000 illustrated in FIG. 9 may have a supply voltage (VDD) input.

While a common supply voltage (VDD) is shown in FIG. 9, examples of the present disclosure are not limited thereto.

In some examples, each element in the SoC 1000 (i.e., NPU, memory, and CPU) may be configured to have an independent or separate supply voltage (VDD).

In other examples, some of the elements within the SoC 1000 (i.e., NPU, memory, and CPU) may be configured to have independent or separate supply voltages (VDD).

In still other examples, certain elements of the SoC 1000 may be configured to receive a second supply voltage that is different from the first supply voltage.

The plurality of NPUs and the plurality of CPUs make requests to the memory controller 350 via the system bus 500, whereby the memory controller 350 may read and/or write data from at least one of the plurality of memories.

In FIG. 9, the clock source 170, the PMIC 180, and the phase determination circuit 190 are the same as those shown in FIGS. 7A, 7B, and 8A.

Accordingly, based on a control signal from the phase determination circuit 190, the clock source 170 may provide a raw clock signal to the first group of PEs in the first NPU 100-1 and a first phase delayed clock signal in which the phase of the raw clock signal is delayed once to the second group of PEs in the first NPU 100-1. Alternatively, based on a control signal from the phase determination circuit 190, the clock source 170 may provide a first phase-delayed clock signal in which the phase of the original clock signal from the clock source 170 is delayed by a certain phase difference to the first group of PEs in the first NPU 100-1, and a second phase-delayed clock signal in which the phase of the original clock signal is delayed twice to the second group of PEs in the first NPU 100-1.

Similarly, based on a control signal from the phase determination circuit 190, the clock source 170 may provide the source clock signal to the first group of PEs in the second NPU 100-2, and further provide the second phase delayed clock signal in which the phase of the source clock signal is delayed once to the second group of PEs in the second NPU 100-2. Alternatively, in response to a control signal from the phase determination circuit 190, the clock source 170 may provide a first phase delayed clock signal having a phase of the original clock signal delayed once to the first group of PEs in the second NPU 100-2, and a second phase delayed clock signal having a phase of the original clock signal delayed twice to the second group of PEs in the second NPU 100-2.

Each element (i.e., NPU, memory, and CPU) within the SoC 1000 illustrated in FIG. 9 may have a supply voltage (VDD) input.

While a common supply voltage (VDD) is shown in FIG. 9, examples of the present disclosure are not limited thereto.

In some examples, each element in the SoC 1000 (i.e., NPU, memory, and CPU) may be configured to have an independent or separate supply voltage (VDD).

In other examples, some of the elements within the SoC 1000 (i.e., NPU, memory, and CPU) may be configured to have independent or separate supply voltages (VDD).

In still other examples, certain elements of the SoC 1000 may be configured to receive a second supply voltage that is different from the first supply voltage.

Figure 10:
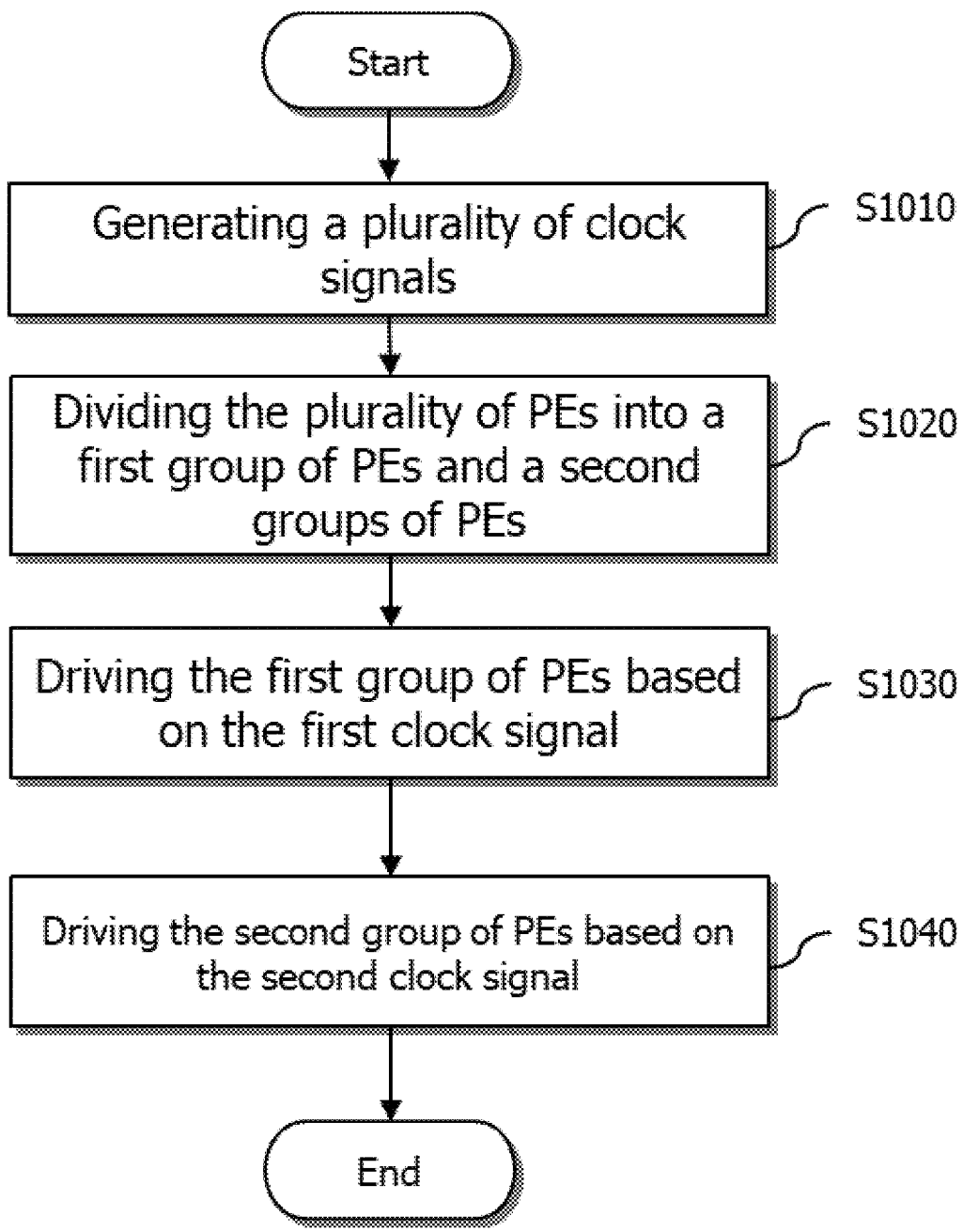
FIG. 10 is an exemplary diagram illustrating an operation method of an NPU according to another example of the present disclosure.

FIG. 10 is an exemplary diagram illustrating a method of operating an NPU according to an example of the present disclosure.

Referring to FIG. 10, a plurality of clock signals for driving a plurality of PEs may be generated S1010. The plurality of clock signals may include a source clock signal and a plurality of phase-delayed clock signals phase-delayed from the source clock signal.

To determine the phase delay, the power of the NPU may be measured. The power may vary depending on the utilization of the plurality of PEs. To reduce the peak power of the NPU, the phase of the original clock signal may be calibrated or adjusted based on the measured power. To determine the phase delay, the power of the NPU may be measured. The power may vary depending on the utilization of the plurality of PEs. To reduce the peak power of the NPU, the phase of the original clock signal may be calibrated or adjusted based on the measured power.

Further, the plurality of PEs may be divided into a first group of PEs and a second groups of PEs S1020. It will be apparent that the number of PEs belonging to each group may vary. In addition, the number of PEs belonging to each group may be changed semi-fixedly or dynamically. Such changing operation may be performed under the control of the NPU controller 130.

Subsequently, the first group of PEs may be driven based on the first clock signal S1030. Also, the second group of PEs may be driven based on the second clock signal S1040.

According to an example of the present disclosure, a method of driving a neural processing unit (NPU) is provided. The method of driving the NPU may include: calibrating at least one phase of one or more clock signals based on a measured power to reduce a peak power of the NPU; and outputting the one or more clock signals. The one or plurality of clock signals may include a first clock signal and a second clock signal. The method of driving the NPU may include operating a first group of processing elements (PEs) based on the first clock signal; and operating a second group of PEs based on the second clock signal.

FIG. 11 illustrates a comparative example in which clock signals of different phases are not input to a plurality of PEs of the NPU.

Referring to FIG. 11, the first clock CLK0 may be input to first group of PEs 110-1 and a second group of PEs 110-2. Here, the PEs 110-1 and 110-2 of each group are configured to receive clock signals of the same phase.

100× of PE utilization in FIG. 11 exemplarily illustrates peak power and supply voltage VDD fluctuation characteristics when one hundred processing elements are activated.

200× of PE utilization in FIG. 11 exemplarily illustrates peak power and supply voltage VDD fluctuation characteristics when two hundred processing elements are activated.

500× of PE utilization in FIG. 11 exemplarily illustrates peak power and supply voltage VDD fluctuation characteristics when five hundred processing elements are activated.

Referring to FIG. 11, as the number of activated processing elements of the neural processing unit 100 increases, the peak power increases and the supply voltage VDD tends to fluctuate.

To explain further, the number of PEs operating for each clock cycle may vary depending on the performance of a compiler that compiles an artificial neural network model. That is, the better the performance of the compiler, the more PEs can be operated per one clock cycle. Here, the ratio of operating PEs among all PEs may be referred to as a PE utilization rate (%). Conversely, the higher the performance of the compiler, the higher the peak power of the NPU can be. That is, the peak power may be directly proportional to the operation rate of the PE. Therefore, as the algorithm of the compiler becomes more sophisticated, there is a problem in that the peak power fluctuation of the NPU may further increase.

Referring to FIG. 11, the peak power of the first group of PEs 110-1 and the second group of PEs 110-2 operating based on the first clock CLK0 may vary depending on the number of PEs operating per one clock cycle. That is, peak power may be increased in proportion to the number of PEs operating at one clock cycle.

To elaborate, the NPU developed with low power platform can be developed to correspond to the M.2 interface or the PCI Express interface when applied to edge devices. In particular, in the case of the M.2 interface, the maximum power may be relatively lower than that of the PCI Express interface. For example, an M.2 interface may have a current limit of 3 A and a power limit of 10 W. If the peak power of the NPU of the comparative example exceeds 10 W at a specific clock cycle, the supply voltage VDD supplied to the NPU may fluctuate. In this case, as the operation rate of the PE increases, the peak power of the NPU further increases, and as the peak power exceeds the power limit, the degree of decrease in the supply voltage VDD may increase in proportion to the degree of exceeding the peak power.

If the supply voltage VDD falls below the IR-drop margin, an error may occur in the data being calculated by the NPU. To explain further, IR-drop can occur when a voltage drop (V=IR) occurs according to Ohm's law, which is caused by the resistance (R) of the metal interconnection and the current (I) flowing through it. When a large number of logic gates associated with multiple PEs of an NPU switch simultaneously, the NPU can consume a significant amount of current. This high current can cause a larger voltage drop across the NPU, reducing the supply voltage in other parts of the SoC.

Summarizing the comparative example of FIG. 11, a sufficient IR-drop margin must be secured to ensure stable operation of the NPU and prevent potential errors. The IR-drop margin may mean the difference between the supply voltage VDD and the lowest allowable voltage at any point of the NPU under any peak power conditions.

FIG. 12 illustrates an example of inputting clock signals of different phases to a plurality of PEs of an NPU in consideration of peak power according to an example of the present disclosure.

It is important to note that as the utilization of processing elements increases, the power can increase proportionally. Therefore, the power of each computation step can be calculated based on the utilization information of the PEs in each computation step and the driving frequency information. The power calculation can be calculated based on the scheduling information of a specific neural network model. Here, the power (Watt) may be calculated as the energy consumed by the corresponding computation step divided by the unit time (i.e., 1 watt (W)=1 joule per second (J/s)). Therefore, the power of each computation step can be calculated based on the scheduling information.

Referring to FIG. 12, the first clock CLK1 may be input to the first group of PEs 110-1, and the second clock CLK2 may be input to the second group of PEs 110-2. Here, the PEs 110-1 and 110-2 of each group are configured to receive clock signals of different phases.

100× of PE utilization in FIG. 12 exemplarily illustrates peak power and supply voltage VDD fluctuation characteristics when one hundred processing elements are activated.

200× of PE utilization in FIG. 12 exemplarily illustrates peak power and supply voltage VDD fluctuation characteristics when two hundred processing elements are activated.

500× of PE utilization in FIG. 12 exemplarily illustrates peak power and supply voltage VDD fluctuation characteristics when five hundred processing elements are activated.

Referring to FIG. 12, as the number of activated processing elements of the neural processing unit 100 increases, the peak power increases and the supply voltage VDD tends to decrease. However, as signal clocks having different phases are input to the PEs of each group, the overall peak power is reduced and the fluctuation of the supply voltage VDD is also reduced.

Here, the average power according to the example of FIG. 12 and the average power according to the comparative example of FIG. 11 are substantially the same. However, the peak power according to the example of FIG. 12 is less than the average power according to the example of FIG. 11. Therefore, the ratio of peak power to average power may be improved according to the example of FIG. 12 compared to the example of FIG. 11.

In other words, the number of PEs operating for each clock cycle may vary depending on the performance of a compiler that compiles an artificial neural network model. That is, the better the performance of the compiler, the more PEs can be operated per one clock cycle. Here, the ratio of operating PEs among all PEs may be referred to as a PE utilization rate (%). Conversely, the higher the performance of the compiler, the higher the peak power of the NPU can be. That is, the peak power may be directly proportional to the operation rate of the PE. Therefore, as the algorithm of the compiler becomes more sophisticated, there is a problem in that the peak power of the NPU may further increase.

Referring to FIG. 12, the peak power of the first group of PEs 110-1 and the second group of PEs 110-2 corresponding to the first clock CLK1 may vary according to the number of PEs operating per clock. That is, peak power may be increased in proportion to the number of PEs operating at one clock cycle.

To elaborate, the NPU developed with low power platform can be developed to correspond to the M.2 interface or the PCI Express interface when applied to edge devices. In particular, in the case of the M.2 interface, the maximum power may be relatively lower than that of the PCI Express interface. For example, an M.2 interface may have a current limit of 3 A and a power limit of 10 W. If the peak power of the NPU of the comparative example exceeds 10 W at a specific clock cycle, the supply voltage VDD supplied to the NPU may fluctuate. In this case, as the operation rate of the PE increases, the peak power of the NPU further increases, and as the peak power exceeds the power limit, the degree of decrease in the supply voltage VDD may increase in proportion to the degree of exceeding the peak power.

If the supply voltage VDD falls below the IR-drop margin, an error may occur in the data being calculated by the NPU.

Meanwhile, the first clock CLK1 may be applied to the first group of PEs 110-1, and the second clock CLK2, which has a different phase from the first clock CLK1, may be applied to the second group of PEs 110-2. Accordingly, the peak power of each group of PEs can be distributed, and the peak power can be reduced by half compared to the comparative example of FIG. 11 in terms of the peak power of the NPU. In this case, stability of the supply voltage VDD may be relatively more stable compared to the comparative example shown in FIG. 11.

That is, according to an example of the present disclosure, the peak power of the NPU may be reduced, and the peak power of the SoC including the NPU may also be reduced.

Also, in the case of low power interfaces like M.2, since the power limit can be low, it can be even more effective in these low power interfaces. However, the present disclosure is not limited to a specific interface circuit.

Brief Summary of Disclosures of the Present Disclosure

The contents of the present disclosure may be summarized and described as follows.

According to an example of the present disclosure, a neural processing unit (NPU) may be provided. The NPU may comprise a first circuit configured to perform operations for an artificial neural network (ANN) model, and arranged for a plurality of groups of processing elements (PEs) including a plurality of PEs; a second circuit arranged to output a plurality of clock signals to the first circuit; a third circuit configured to measure a ratio of peak power and average power of at least the first circuit; and a fourth circuit, arranged to dynamically calibrate a phase of at least one of the plurality of clock signals of the second circuit based on the ratio of peak power and average power measured in the third circuit.

If the peak power value measured by the third circuit is higher than a threshold power value, the fourth circuit may be configured to dynamically adjust the phase of at least one of the plurality of clock signals.

At least one phase of the plurality of clock signals may be adjusted based on a predetermined threshold power value based on utilization rate of the plurality of PE groups.

The third circuit may be configured to measure a first peak power value of the first circuit. The third circuit may be configured to provide the first peak power value to the fourth circuit. The fourth circuit may be configured to correct the phase of at least one of the plurality of clock signals. The third circuit may be configured to re-measure a second peak power value of the first circuit. The fourth circuit may be configured to determine whether the second peak power value is less than the first peak power value.

The third circuit may be configured to measure a first peak power value at a first time point. The fourth circuit may be configured to correct the phase of at least one of the plurality of clock signals by comparing the first peak power value at the first time point with a predetermined threshold power value.

The plurality of clock signals may include: a first clock signal operated by a first group of PEs of the plurality of groups of PEs; and a second clock signal operated by a second group of PEs of the plurality of groups of PEs.

The plurality of clock signals may include: a first clock signal having a first phase; and a second clock signal having a second phase that is later than the first phase of the first clock signal.

The plurality of clock signals may include: a first clock signal generated based on a source clock signal; and a second clock signal generated by shifting or drifting the source clock signal.

The first circuit may include: a source clock signal; one or more phase converters connected in a chain, wherein a first phase converter of the one or more phase converters is connected to the source clock signal; and a selector connected to an output of the source clock signal and an output of the one or more phase converters, wherein the selector is configured to select at least one output from the output of the source clock signal and the output of the one or more phase converters.

According to an example of the present disclosure, a system on chip (SoC) may be provided. The SoC may comprise: a semi-conductor substrate; a first circuit, disposed on the semi-conductor substrate, configured to perform operations for an artificial neural network (ANN) model, and arranged for a plurality of groups of processing elements (PEs) including a plurality of PEs; a second circuit, disposed on the semi-conductor substrate, arranged to output a plurality of clock signals to the first circuit; a third circuit, disposed on the semi-conductor substrate, configured to measure a ratio of peak power and average power of at least the first circuit; and a fourth circuit, disposed on the semi-conductor substrate, arranged to dynamically calibrate a phase of at least one of the plurality of clock signals of the second circuit based on the ratio of peak power and average power measured in the third circuit.

If the peak power value measured by the third circuit is higher than a threshold power value, the fourth circuit may be configured to dynamically adjust the phase of at least one of the plurality of clock signals.

At least one phase of the plurality of clock signals may be adjusted based on a predetermined threshold power value based on utilization rate of the plurality of PE groups.

The third circuit may be configured to measure a first peak power value of the first circuit. The third circuit may be configured to provide the first peak power value to the fourth circuit. The fourth circuit may be configured to correct the phase of at least one of the plurality of clock signals. The third circuit may be configured to re-measure a second peak power value of the first circuit. The fourth circuit may be configured to determine whether the second peak power value is less than the first peak power value.

The third circuit may be configured to measure a first peak power value at a first time point, wherein the fourth circuit may be configured to correct the phase of at least one of the plurality of clock signals by comparing the first peak power value at the first time point with a predetermined threshold power value.

The plurality of clock signals may include: a first clock signal operated by a first group of PEs of the plurality of groups of PEs; and a second clock signal operated by a second group of PEs of the plurality of groups of PEs.

According to an example of the present disclosure, an electronic device may be provided. The electronic device may comprise: a printed circuit board; a first circuit, disposed on the printed circuit board, configured to perform operations for an artificial neural network (ANN) model, and arranged for a plurality of groups of processing elements (PEs) including a plurality of PEs; a second circuit, disposed on the printed circuit board, arranged to output a plurality of clock signals to the first circuit; a third circuit, disposed on the printed circuit board, configured to measure a ratio of peak power and average power of at least the first circuit; and a fourth circuit, disposed on the printed circuit board, arranged to dynamically calibrate a phase of at least one of the plurality of clock signals of the second circuit based on the ratio of peak power and average power measured in the third circuit.

If the peak power value measured by the third circuit is higher than a threshold power value, the fourth circuit may be configured to dynamically adjust the phase of at least one of the plurality of clock signals.

At least one phase of the plurality of clock signals may be adjusted based on a predetermined threshold power value based on utilization rate of the plurality of PE groups.

The third circuit may be configured to measure a first peak power value of the first circuit. The third circuit may be configured to provide the first peak power value to the fourth circuit. The fourth circuit may be configured to correct the phase of at least one of the plurality of clock signals. The third circuit may be configured to re-measure a second peak power value of the first circuit. The fourth circuit may be configured to determine whether the second peak power value is less than the first peak power value.

The third circuit may be configured to measure a first peak power value at a first time point, wherein the fourth circuit may be configured to correct the phase of at least one of the plurality of clock signals by comparing the first peak power value at the first time point with a predetermined threshold power value.

Examples of the present disclosure described in the present disclosure and drawings are merely presented as specific examples to easily explain the technical content of the present disclosure and help understanding of the present disclosure, and are not intended to limit the scope of the present disclosure. It is apparent to those of ordinary skill in the art that other modified examples can be implemented or derived in addition to the examples described.

National Research and Development Project That Supported This Invention

[Assignment number] 1711193247
[Assignment number] 2022-0-00248-002
[Ministry Name] Ministry of Science and ICT
[Name of project management (professional) organization] Information and Communications Planning and Evaluation Institute
[Research project name] PIM artificial intelligence semiconductor core technology development (design)
[Research project name] Development of CXL-based PIM semiconductor technology for multiple DRAM modules considering memory consistency
[Contribution rate] 1/1
[Name of project carrying out organization] DeepX Co., Ltd.
[Research period] 2023.01.01~2023.12.31

What is claimed is:

1. A neural processing unit (NPU) comprising:
a first circuit configured to perform operations for an artificial neural network (ANN) model, and arranged for a plurality of groups of processing elements (PEs) including a plurality of PEs;
a second circuit arranged to output a plurality of clock signals to the first circuit;
a third circuit configured to measure a ratio of peak power and average power of at least the first circuit; and
a fourth circuit arranged to dynamically calibrate a phase of at least one of the plurality of clock signals of the second circuit based on the ratio of peak power and average power measured in the third circuit, wherein the third circuit is configured to measure a first peak power value of the first circuit, to provide the first peak power value to the fourth circuit and to re-measure a second peak power value of the first circuit, and wherein the fourth circuit is configured to correct the phase of at least one of the plurality of clock signals and to determine whether the second peak power value is less than the first peak power value.

2. The NPU of claim 1,
wherein when a peak power value measured by the third circuit is higher than a threshold power value, the fourth circuit dynamically adjusts the phase of at least one of the plurality of clock signals.

3. The NPU of claim 1,
wherein at least one phase of the plurality of clock signals is adjusted based on a predetermined threshold power value based on utilization rate of the plurality of groups of PEs.

4. The NPU of claim 1,
wherein the third circuit is configured to measure the first peak power value at a first time point, and
wherein the fourth circuit is configured to correct the phase of at least one of the plurality of clock signals by comparing the first peak power value at the first time point with a predetermined threshold power value.

5. The NPU of claim 1,
wherein the plurality of clock signals comprises:
a first clock signal operated by a first group of PEs of the plurality of groups of PEs; and
a second clock signal operated by a second group of PEs of the plurality of groups of PEs.

6. The NPU of claim 1,
wherein the plurality of clock signals comprises:
a first clock signal having a first phase; and
a second clock signal having a second phase that is later than the first phase of the first clock signal.

7. The NPU of claim 1,
wherein the plurality of clock signals comprises:
a first clock signal generated based on a source clock signal; and
a second clock signal generated by shifting or drifting the source clock signal.

8. The NPU of claim 1,
wherein the first circuit comprises:
a source clock signal;
one or more phase converters connected in a chain, wherein the one or more phase converters include a first phase converter connected to the source clock signal; and
a selector connected to an output of the source clock signal and an output of the one or more phase converters, wherein the selector is configured to select at least one output from the output of the source clock signal and the output of the one or more phase converters.

9. A system on chip (SoC) comprising:
a semi-conductor substrate;
a first circuit, disposed on the semi-conductor substrate, configured to perform operations for an artificial neural network (ANN) model, and arranged for a plurality of groups of processing elements (PEs) including a plurality of PEs;
a second circuit, disposed on the semi-conductor substrate, arranged to output a plurality of clock signals to the first circuit;
a third circuit, disposed on the semi-conductor substrate, configured to measure a ratio of peak power and average power of at least the first circuit; and
a fourth circuit, disposed on the semi-conductor substrate, arranged to dynamically calibrate a phase of at least one of the plurality of clock signals of the second circuit based on the ratio of peak power and average power measured in the third circuit,
wherein the third circuit is configured to measure a first peak power value of the first circuit, to provide the first peak power value to the fourth circuit and to re-measure a second peak power value of the first circuit, and
wherein the fourth circuit is configured to correct the phase of at least one of the plurality of clock signals and to determine whether the second peak power value is less than the first peak power value.

10. The SoC of claim 9,
wherein when a peak power value measured by the third circuit is higher than a threshold power value, the fourth circuit dynamically adjusts the phase of at least one of the plurality of clock signals.

11. The SoC of claim 9,
wherein at least one phase of the plurality of clock signals is adjusted based on a predetermined threshold power value based on utilization rate of the plurality of groups of PEs.

12. The SoC of claim 9,
wherein the third circuit is configured to measure the first peak power value at a first time point, and
wherein the fourth circuit is configured to correct the phase of at least one of the plurality of clock signals by comparing the first peak power value at the first time point with a predetermined threshold power value.

13. The SoC of claim 9,
wherein the plurality of clock signals comprises:
a first clock signal operated by a first group of PEs of the plurality of groups of PEs; and
a second clock signal operated by a second group of PEs of the plurality of groups of PEs.

14. An electronic device comprising:
a printed circuit board;
a first circuit, disposed on the printed circuit board, configured to perform operations for an artificial neural network (ANN) model, and arranged for a plurality of groups of processing elements (PEs) including a plurality of PEs;
a second circuit, disposed on the printed circuit board, arranged to output a plurality of clock signals to the first circuit;
a third circuit, disposed on the printed circuit board, configured to measure a ratio of peak power and average power of at least the first circuit; and
a fourth circuit, disposed on the printed circuit board, arranged to dynamically calibrate a phase of at least one of the plurality of clock signals of the second circuit based on the ratio of peak power and average power measured in the third circuit,
wherein the third circuit is configured to measure a first peak power value of the first circuit, to provide the first peak power value to the fourth circuit and to re-measure a second peak power value of the first circuit, and
wherein the fourth circuit is configured to correct the phase of at least one of the plurality of clock signals and to determine whether the second peak power value is less than the first peak power value.

15. The electronic device of claim 14,
wherein when a peak power value measured by the third circuit is higher than a threshold power value, the fourth circuit dynamically adjusts the phase of at least one of the plurality of clock signals.

16. The electronic device of claim 14,
wherein at least one phase of the plurality of clock signals is adjusted based on a predetermined threshold power value based on utilization rate of the plurality of groups of PEs.

17. The electronic device of claim 14,
wherein the third circuit is configured to measure the first peak power value at a first time point, and
wherein the fourth circuit is configured to correct the phase of at least one of the plurality of clock signals by comparing the first peak power value at the first time point with a predetermined threshold power value.

* * * * *